(12) United States Patent
Kim et al.

(10) Patent No.: US 11,411,715 B2
(45) Date of Patent: Aug. 9, 2022

(54) SYSTEM AND METHOD FOR GENERATING SCALABLE GROUP KEY BASED ON HOMOMORPHIC ENCRYPTION WITH TRUST SERVER

(71) Applicant: KOREA ADVANCED INSTITUTE OF SCIENCE AND TECHNOLOGY, Daejeon (KR)

(72) Inventors: KwangJo Kim, Daejeon (KR); Rakyong Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 145 days.

(21) Appl. No.: 16/907,606

(22) Filed: Jun. 22, 2020

(65) Prior Publication Data

US 2021/0044419 A1    Feb. 11, 2021

(30) Foreign Application Priority Data

Aug. 8, 2019   (KR) ......................... 10-2019-0096564

(51) Int. Cl.
*H04L 9/00* (2022.01)
*H04L 9/08* (2006.01)

(52) U.S. Cl.
CPC ............ *H04L 9/008* (2013.01); *H04L 9/0825* (2013.01); *H04L 9/0838* (2013.01); *H04L 9/0869* (2013.01)

(58) Field of Classification Search
CPC ..... H04L 9/008; H04L 9/0838; H04L 9/0869; H04L 9/0825; H04L 9/0833; H04L 9/00; H04L 9/08
See application file for complete search history.

(56) References Cited

U.S. PATENT DOCUMENTS

| 2018/0295114 A1* | 10/2018 | Abdalla | H04L 9/0844 |
| 2019/0116048 A1* | 4/2019 | Chen | H04W 4/48 |
| 2019/0372763 A1* | 12/2019 | Yang | H04L 9/008 |

FOREIGN PATENT DOCUMENTS

KR            101568871            11/2015

OTHER PUBLICATIONS

A Novel Non-Interactive Multi-party Key Exchange from Homomorphic Encryption, Provable Security Workshop 2018 (in conjunction with the 12th International Conference on Provable Security), Oct. 25, 2018.

(Continued)

*Primary Examiner* — Quazi Farooqui
(74) *Attorney, Agent, or Firm* — Heslin Rothenberg Farley & Mesiti, P.C.

(57) ABSTRACT

Disclosed are a communication system and an operating method thereof. A plurality of electronic devices for forming a group may be configured to share a homomorphic encryption (HE) key. A server may be configured to generate a Boolean circuit for performing an operation based on input values corresponding to the number of electronic devices. Each of the electronic devices may be configured to transmit an encrypted session ephemeral key to the server through HE. The server may be configured to calculate an HE-evaluated value by applying the encrypted session ephemeral keys as the input values of the Boolean circuit. The server may be configured to transmit the HE-evaluated value and a given random number to each electronic device. Each electronic device may be configured to generate a common session key for the group based on the HE key, the HE-evaluated value and the given random number through homomorphic decryption.

16 Claims, 16 Drawing Sheets

(56) References Cited

OTHER PUBLICATIONS

DHL: Dynamic Key Exchange from Homomorphic Encryption based on Lattice, 2019 Symposium on Cryptography and Information Security Shiga, Japan, Jan. 22-25, 2019, The Institute of Electronics, Information and Communication Engineers.

Adriana Lopez-Alt et al.; On-the-Fly Multiparty Computation on the Cloud via Multikey Fully Homomorphic Encryption; Proceedings of the forty-fourth Annual ACM Symposium on Theory of Computing; pp. 1-73; 2012.

\* cited by examiner

SYSTEM AND METHOD FOR GENERATING SCALABLE GROUP KEY BASED ON HOMOMORPHIC ENCRYPTION WITH TRUST SERVER

CROSS REFERENCE TO RELATED APPLICATION

This application claims priority under 35 U.S.C. § 119(a) to Korean Patent Application No. 10-2019-0096564 filed on Aug. 8, 2019, which is incorporated herein by reference in its entirety.

BACKGROUND OF THE INVENTION

Technical Field

Various embodiments relate to a communication system and an operating method thereof and, more particularly, to a method and system for generating a scalable group key based on homomorphic encryption (HE) with a trust server.

Description of the Related Art

Communication between electronic devices through an insecure channel requires key exchange protocol for preventing an attack to read a message, such as unauthorized access or accidental disclosure of information. For secure transmission, a message needs to be encrypted by an encryption key and needs to be transmitted from any one of electronic devices to the other. A solution for this depends on how a key can be safely shared between the electronic devices.

SUMMARY OF THE INVENTION

Various embodiments may provide a communication system through which electronic devices attempting to form a group can safely share a group key to be used for mutual communication and an operating method thereof.

Various embodiments may provide a communication system capable of preventing a group key from being exposed to an element other than electronic devices within a group and an operating method thereof.

An operating method of a communication system according to a first embodiment may include sharing, by a plurality of electronic devices for forming a group, a homomorphic encryption (HE) key, generating, by a server, a Boolean circuit for performing an operation based on input values corresponding to the number of electronic devices, transmitting, by each of the electronic devices, an encrypted session ephemeral key to the server through HE, calculating, by the server, an HE-evaluated value by applying the encrypted session ephemeral keys as the input values of the Boolean circuit, transmitting, by the server, the HE-evaluated value and a given random number to each of the electronic devices, and generating, by each of the electronic devices, a common session key for the group based on the HE key, the HE-evaluated value and the given random number through homomorphic decryption.

A communication system according to a first embodiment may include a plurality of electronic devices configured to share a homomorphic encryption (HE) key in order to form a group and a server configured to generate a Boolean circuit for performing an operation based on input values corresponding to the number of electronic devices.

According to the first embodiment, the server may be configured to receive an encrypted session ephemeral key from each of the electronic devices through HE, calculate an HE-evaluated value by applying the encrypted session ephemeral keys as the input values of the Boolean circuit, and transmit the HE-evaluated value and a given random number to each of the electronic devices.

According to the first embodiments, each of the electronic devices may be configured to generate a common session key for the group based on the HE key, the HE-evaluated value and the given random number through homomorphic decryption.

An operating method of a communication system according to a second embodiment may include sharing, by a plurality of electronic devices for forming a group, a homomorphic encryption (HE) key, generating, by a server, a Boolean circuit for performing an operation based on input values corresponding to the number of electronic devices, transmitting, by each of the electronic devices, an encrypted session ephemeral key to the server through HE, calculating, by the server, an HE-evaluated value by applying the encrypted session ephemeral keys as the input values of the Boolean circuit, transmitting, by the server, the HE-evaluated value to each of the electronic devices, and generating, by each of the electronic devices, a common session key for the group based on the HE key and the HE-evaluated value through homomorphic decryption.

A communication system according to a second embodiment may include a plurality of electronic devices configured to share a homomorphic encryption (HE) key in order to form a group and a server configured to generate a Boolean circuit for performing an operation based on input values corresponding to the number of electronic devices.

According to the second embodiment, the server may be configured to receive an encrypted session ephemeral key from each of the electronic devices through HE, calculating an HE-evaluated value by applying the encrypted session ephemeral keys as the input values of the Boolean circuit, and transmit the HE-evaluated value to each of the electronic devices.

According to the second embodiments, each of the electronic devices may be configured to generate a common session key for the group based on the HE key and the HE-evaluated value through homomorphic decryption.

DETAILED DESCRIPTION

Hereinafter, various embodiments of this document are described with reference to the accompanying drawings.

Figure 1:
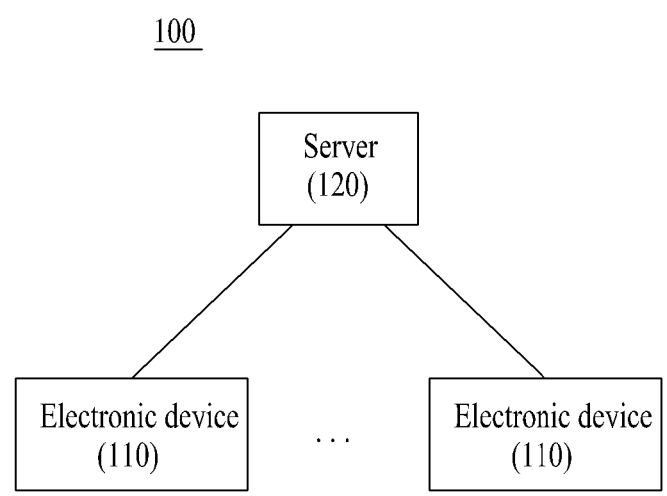
FIG. 1 is a diagram illustrating a communication system according to various embodiments.

FIG. 1 is a diagram illustrating a communication system 100 according to various embodiments.

Referring to FIG. 1, the communication system 100 according to various embodiments may include a plurality of electronic devices 110 and a server 120.

At least some of the electronic devices 110 may perform communication through a communication channel. In this case, for communication security, at least some of the electronic devices 110 may form a group. The electronic devices within the group 110 may perform communication using a group key, that is, a common session key. To this end, when forming the group, at least some of the electronic devices 110 may generate the group key. Although not illustrated, each of the electronic devices 110 may include at least one of a communication module for generating a communication channel and supporting communication, a memory for storing a program for an operation of each of the electronic devices 110 and data generated while a program is performed, or a processor configured to control the elements of each of the electronic devices 110 and to perform an overall operation of each of the electronic devices 110.

The server 120 may support at least some of the electronic devices 110 to safely share a group key. When at least some of the electronic devices 110 form a group, the server 120 may enable at least some of the electronic devices 110 to individually generate the same group key. In this case, the group key is safely shared by only the electronic devices within the group, and may not be exposed to the server. Although not illustrated, the server 120 may include at least one of a communication module for generating a communication channel and supporting communication, a memory for storing a program for an operation of the server 120 and data generated while a program is performed or a processor configured to control the elements of the server 120 and an overall operation of the server 120.

According to various embodiments, the communication system 100 may enable electronic devices, attempting to form a group, to safely share a group key to be used for mutual communication between the electronic devices using a homomorphic encryption (HE) scheme. In this case, in relation to the HE scheme, an HE key, homomorphic encryption, homomorphic decryption and a homomorphic operation may be defined. The HE key may indicate a key used in at least any one of homomorphic encryption or homomorphic decryption. In this case, the HE key may include at least one of a homomorphic secret key (sk_HE) or a homomorphic public key (pk_HE). The HE key may be output by at least any one of the electronic devices 110 within the group, and may be shared between the electronic devices 110 within the group. In this case, the HE key, particularly, the homomorphic secret key (sk_HE) may not be exposed to the server 120. The homomorphic encryption may encrypt a given message using the homomorphic public key (pk_HE), and thus may output a cryptogram. The homomorphic decryption may decrypt the cryptogram using the homomorphic secret key (sk_HE), and thus may output a message. The homomorphic operation performs an operation using a set of a plurality of cryptograms and a Boolean circuit C, and thus may output results.

Figure 2A:
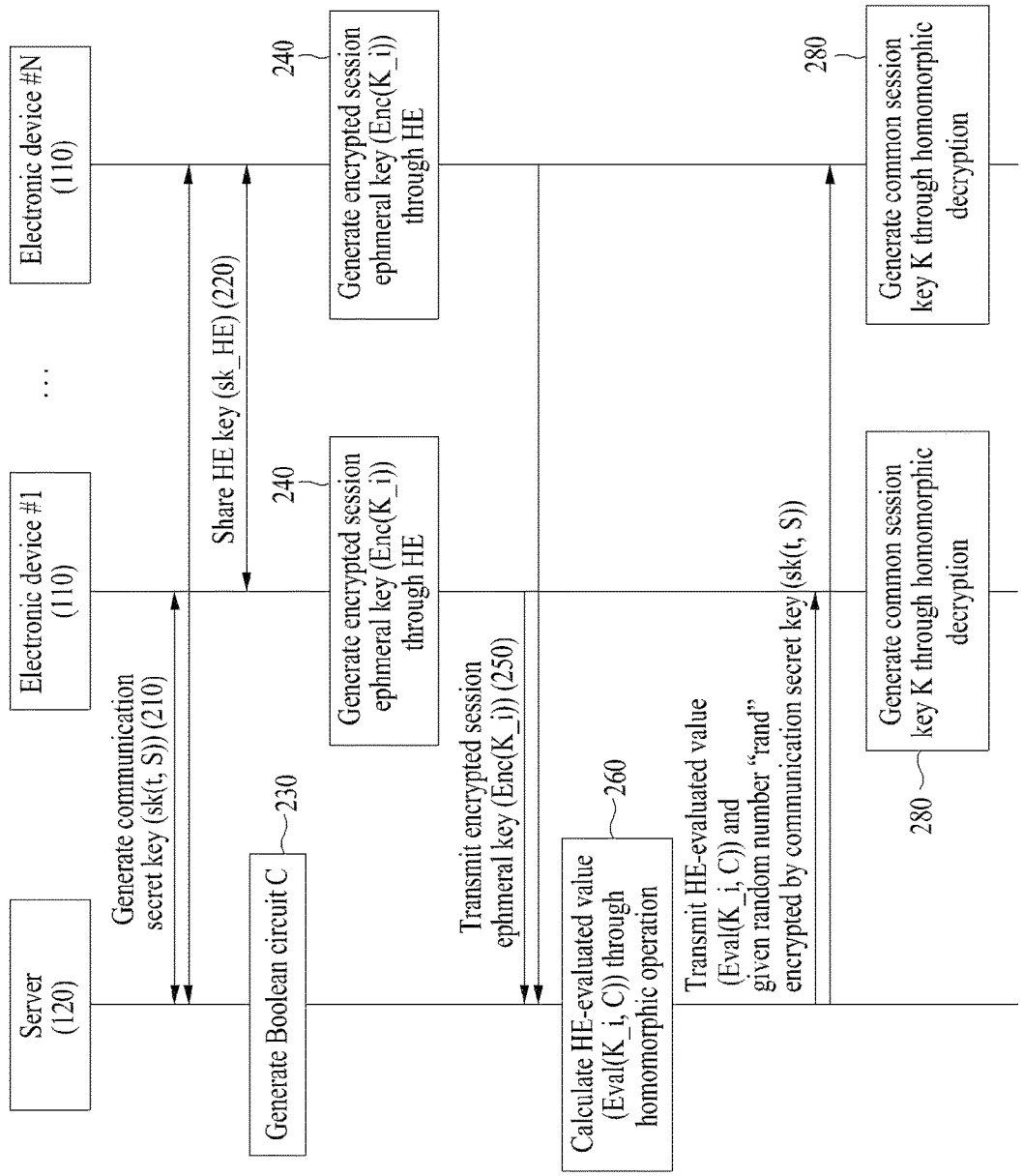
FIGS. 2A and 2B are diagrams illustrating an operating method of the communication system for generating a group key according to a first embodiment.
Figure 2B:
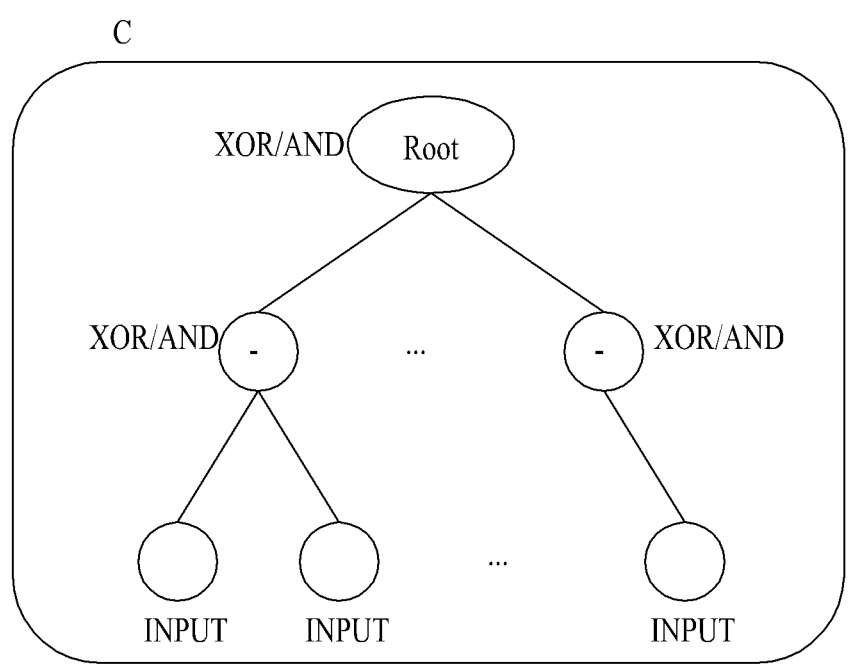

FIGS. 2A and 2B are diagrams illustrating an operating method of the communication system 100 for generating a group key according to a first embodiment.

Referring to FIG. 2A, at operation 210, a plurality of electronic devices, that is, N electronic devices 110 attempting to form a group, and the server 120 may generate secret keys for mutual communication, that is, communication secret keys (sk(t, S)). In this case, each of the electronic devices, for example, a t-th electronic device 110 and the server 120 may generate a communication secret key (sk(t, S)) for individual mutual communication.

At operation 220, the electronic devices 110 may share an HE key. In this case, the HE key may include at least one of a homomorphic secret key (sk_HE) or a homomorphic public key (pk_HE). In this case, the HE key, particularly, the homomorphic secret key (sk_HE) may not be exposed to the server 120.

At operation 230, the server 120 may generate a Boolean circuit C. The server 120 may generate the Boolean circuit C having a structure for performing an operation based on input values INPUT corresponding to the number of electronic devices 110. For example, the server 120 may generate the Boolean circuit C having a structure, such as that illustrated in FIG. 2B. In this case, the middle operator of the Boolean circuit C may include an XOR/AND operator.

At operation 240, each of the electronic devices 110 may generate an encrypted session ephemeral keys (Enc(K_i)) through HE. Each of the electronic devices 110 may generate each of the encrypted session ephemeral keys (Enc(K_i)) by encrypting the homomorphic public key (pk_HE) and each of the session ephemeral keys (K_i) based on an algorithm for HE. Thereafter, at operation 250, each of the electronic devices 110 may transmit each of the encrypted session ephemeral keys (Enc(K_i)) to the server 120.

At operation 260, the server 120 may calculate an HE-evaluated value (Eval(K_i, C)) through a homomorphic operation. The server 120 may calculate the HE-evaluated value (Eval(K_i, C)) by applying the encrypted session ephemeral keys (Enc(K_i)) as the input values of the Boolean circuit C. Thereafter, at operation 270, the server 120 may transmit the HE-evaluated value (Eval(K_i, C)) and a given random number "rand" to each of the electronic devices 110. In this case, the server 120 may encrypt the given random number "rand" using each of the communication secret keys (sk(t, S)), and may transmit the HE-evaluated value (Eval(K_i, C)) and the encrypted random number "rand" together.

At operation 280, each of the electronic devices 110 may generate a group key, that is, a common session key K, through homomorphic decryption. Each of the electronic devices 110 may generate the session key K based on the HE key, the HE-evaluated value (Eval(K_i, C)) and the given random number "rand." Accordingly, the N electronic devices 110 may be grouped, and may perform communication using the group key that is the session key K.

Figure 3A:
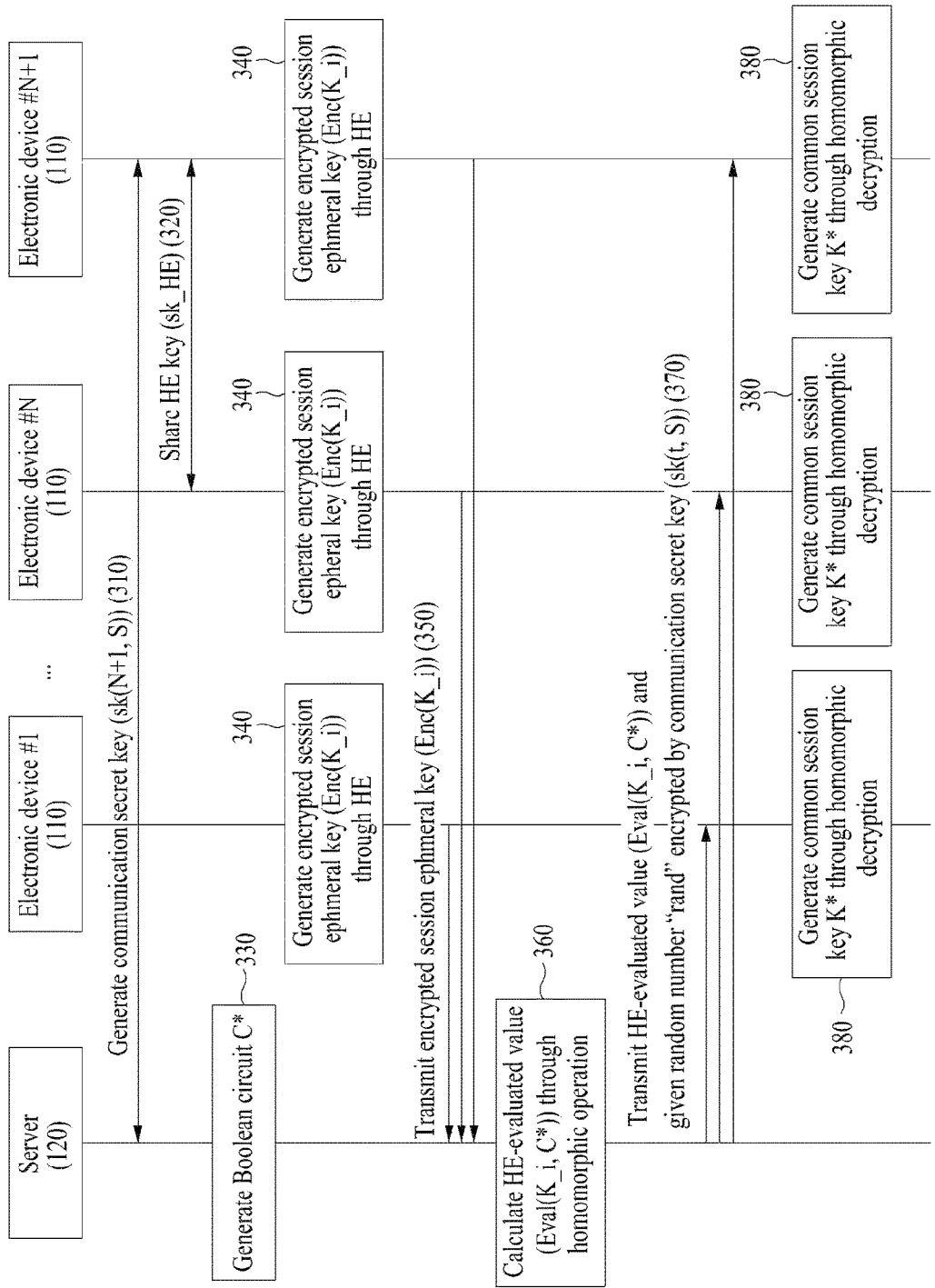
FIGS. 3A and 3B are diagrams illustrating an operating method of the communication system for the update of a group key according to a first embodiment.
Figure 3B:
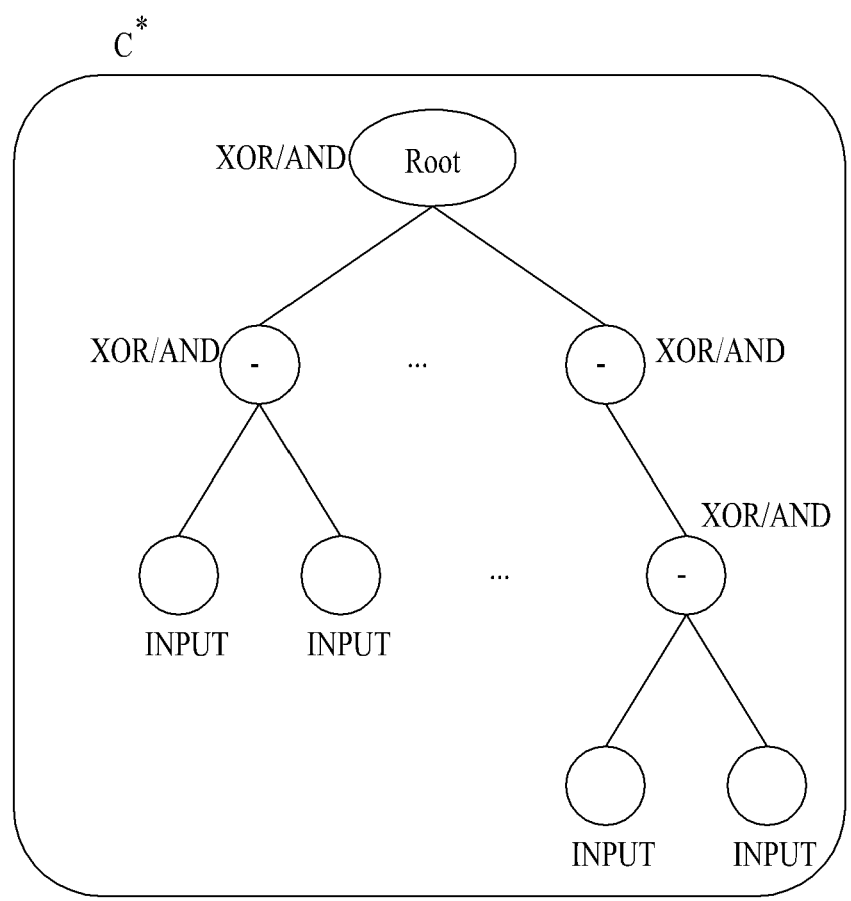

FIGS. 3A and 3B are diagrams illustrating an operating method of the communication system 100 for the update of a group key according to a first embodiment.

Referring to FIG. 3A, the communication system 100 may detect at least another, for example, an (N+1)-th electronic device 110 to be added to a group configured with a plurality of electronic devices, that is, N electronic devices 110. In response to the detection, at operation 310, another electronic device 110 and the server 120 may generate a secret key for mutual communication, that is, a communication secret key (sk(N+1, S)). In this case, another electronic device 110 and the server 120 may generate the communication secret key (sk(N+1, S)) for individual mutual communication.

At operation 320, the electronic devices 110 may share an HE key. In this case, at least any one of the electronic devices 110 within the group may transmit the HE key to another electronic device 110. In this case, the HE key, particularly, a homomorphic secret key (sk_HE) may not be exposed to the server 120.

At operation 330, the server 120 may generate a Boolean circuit C* from a previously generated Boolean circuit C. The server 120 may generate the Boolean circuit C* from the previously generated Boolean circuit C based on a graph minor theory. The server 120 may generate the Boolean circuit C* having a structure for performing an operation based on input values corresponding to the number of electronic devices 110, that is, the number of electronic devices 110 within the group and another electronic device 110. For example, the server 120 may generate the Boolean circuit C* having a structure, such as that illustrated in FIG. 3B. For example, the server 120 may generate the Boolean circuit C* by adding, to the previously generated Boolean circuit C, at least one input value corresponding to another electronic device 110 and adding at least one middle operator between a middle operator of the previously generated Boolean circuit C and the added input value. In this case, the server 120 may generate the Boolean circuit C* so that the depth of the Boolean circuit C* is minimized. The middle operator of the Boolean circuit C* may include an XOR/AND operator. Accordingly, the server 120 may update the previously generated Boolean circuit C with the Boolean circuit C*.

At operation 340, each of the electronic devices 110 may generate an encrypted session ephemeral keys (Enc(K_i)) through HE. Each of the electronic devices 110 may generate each of the encrypted session ephemeral keys (Enc(K_i)) by encrypting a homomorphic public key (pk_HE) and each of session ephemeral keys (K_i) based on an algorithm for HE. Thereafter, at operation 350, each of the electronic devices 110 may transmit the encrypted session ephemeral key (Enc(K_i)) to the server 120.

At operation 360, the server 120 may calculate an HE-evaluated value (Eval(K_i, C*)) through a homomorphic operation. The server 120 may calculate the HE-evaluated value (Eval(K_i, C*)) by applying the encrypted session ephemeral keys (Enc(K_i)) as the input values of the Boolean circuit C*. Thereafter, at operation 370, the server 120 may transmit the HE-evaluated value (Eval(K_i, C*)) and a given random number "rand*" to each of the electronic devices 110. In this case, the server 120 may encrypt the given random number "rand*" using each of communication secret keys (sk(t, S)), and may transmit the HE-evaluated value (Eval(K_i, C*)) and the encrypted random number "rand*" together.

At operation 380, each of the electronic devices 110 may generate a group key, that is, a common session key (K*), through homomorphic decryption. Each of the electronic devices 110 may generate the session key (K*) based on the HE key, the HE-evaluated value (Eval(K_i, C*)) and the given random number "rand*." Accordingly, the electronic devices 110 may update the previously generated session key K with the session key (K*). Accordingly, the (N+1) electronic devices 110 may be grouped, and may perform communication using the group key, that is, the session key (K*).

Figure 4A:
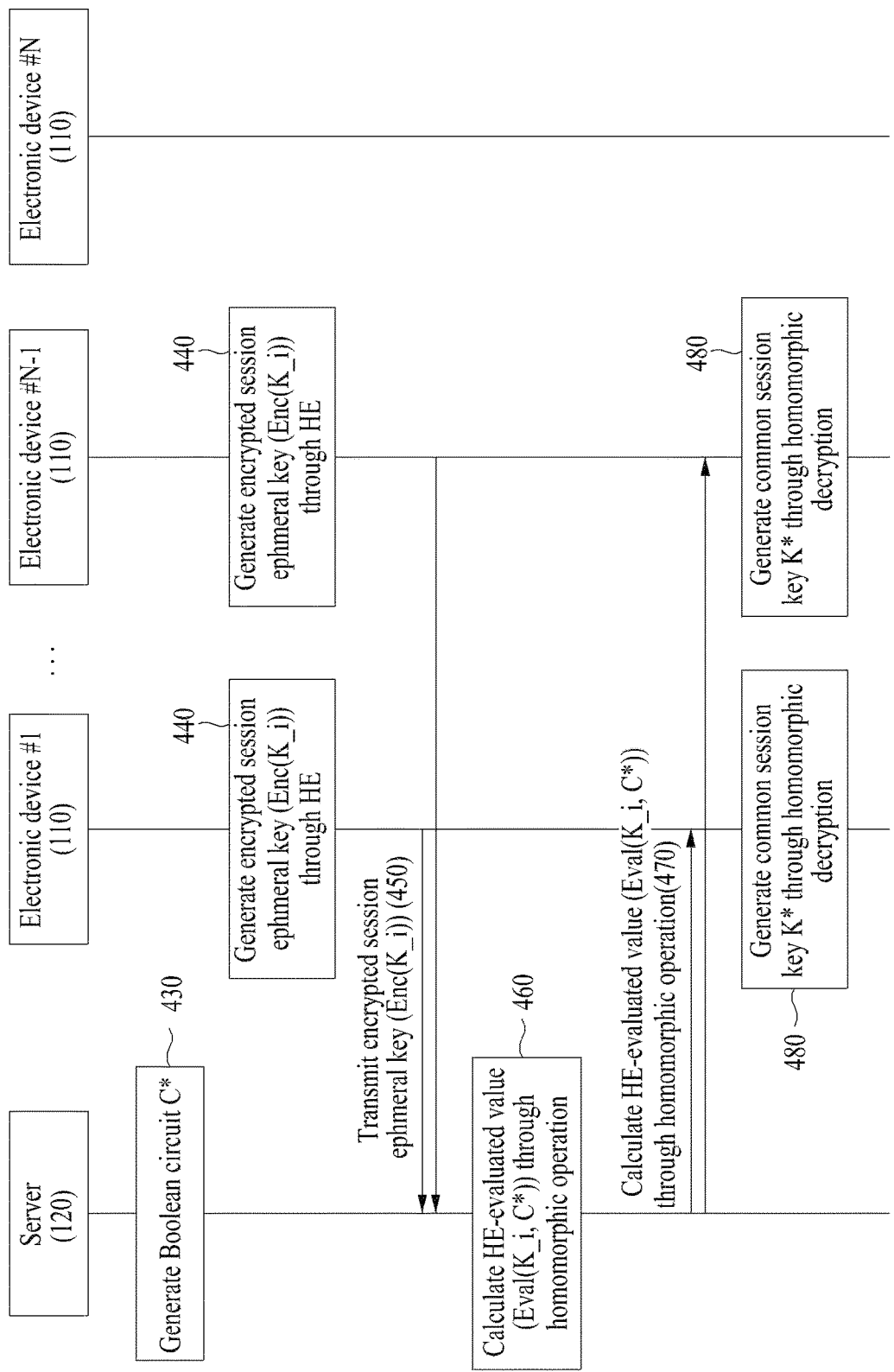
FIGS. 4A and 4B are diagrams illustrating an operating method of the communication system for the update of a group key according to a first embodiment.
Figure 4B:
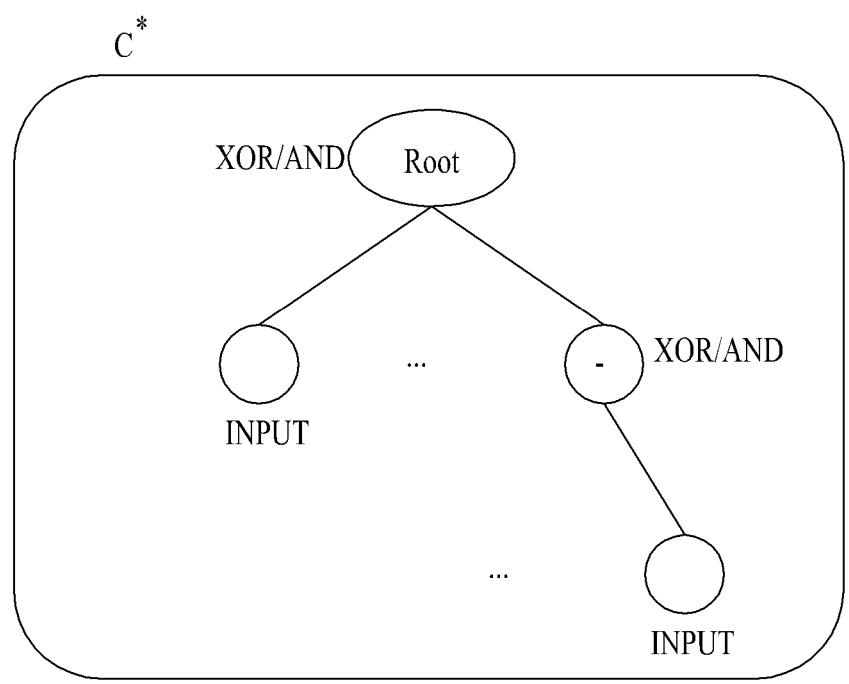

FIGS. 4A and 4B are diagrams illustrating an operating method of the communication system 100 for the update of a group key according to a first embodiment.

Referring to FIG. 4A, the communication system 100 may detect at least one, for example, an N-th electronic device 110 removed from a group configured with a plurality of electronic devices, that is, N electronic devices 110. In response to the detection, at operation 430, the server 120 may generate a Boolean circuit C* from a previously generated Boolean circuit C. The server 120 may generate the Boolean circuit C* from the previously generated Boolean circuit C based on a graph minor theory. The server 120 may generate the Boolean circuit C* having a structure for performing an operation based on input values corresponding to the remainder of the electronic devices 110, for example, the number of (N−1) electronic devices 110. For example, the server 120 may generate the Boolean circuit C* having a structure, such as that illustrated in FIG. 4B. For example, the server 120 may generate the Boolean circuit C* by removing at least one input value removed from the previously generated Boolean circuit C and corresponding to the number of electronic devices 110 and selectively removing a middle operator for the input value removed from the previously generated Boolean circuit C. The middle operator of the Boolean circuit C* may include an XOR/AND operator. Accordingly, the server 120 may update the previously generated Boolean circuit C with the Boolean circuit C*.

At operation 440, each of the remaining electronic devices 110 may generate an encrypted session ephemeral keys (Enc(K_i)) through HE. Each of the remaining electronic devices 110 may generate each of the encrypted session ephemeral keys (Enc(K_i)) by encrypting a homomorphic public key (pk_HE) and each of session ephemeral keys (K_i) based on an algorithm for HE. Thereafter, at operation 450, each of the remaining electronic devices 110 may transmit each of the encrypted session ephemeral keys (Enc(K_i)) to the server 120.

At operation 460, the server 120 may calculate an HE-evaluated value (Eval(K_i, C*)) through a homomorphic operation. The server 120 may calculate the HE-evaluated value (Eval(K_i, C*)) by applying the encrypted session ephemeral keys (Enc(K_i)) as the input values of the Boolean circuit C*. Thereafter, at operation 470, the server 120 may transmit the HE-evaluated value (Eval(K_i, C*)) and a given random number "rand*" to each of the remaining electronic devices 110. In this case, the server 120 may encrypt the given random number "rand*" using each of the communication secret keys (sk(t, S)), and may transmit the HE-evaluated value (Eval(K_i, C*)) and the encrypted random number "rand*" together.

At operation 480, each of the remaining electronic devices 110 may generate a group key, that is, a common session key (K*) through homomorphic decryption. Each of the remaining electronic devices 110 may generate the session key (K*) based on an HE key, the HE-evaluated value (Eval(K_i, C*)) and the given random number "rand*." Accordingly, the remaining electronic devices 110 may update a previously generated session key K with the session key (K*). Accordingly, the (N−1) electronic devices 110 may be grouped to perform communication using the group key, that is, the session key (K*).

Figure 5:
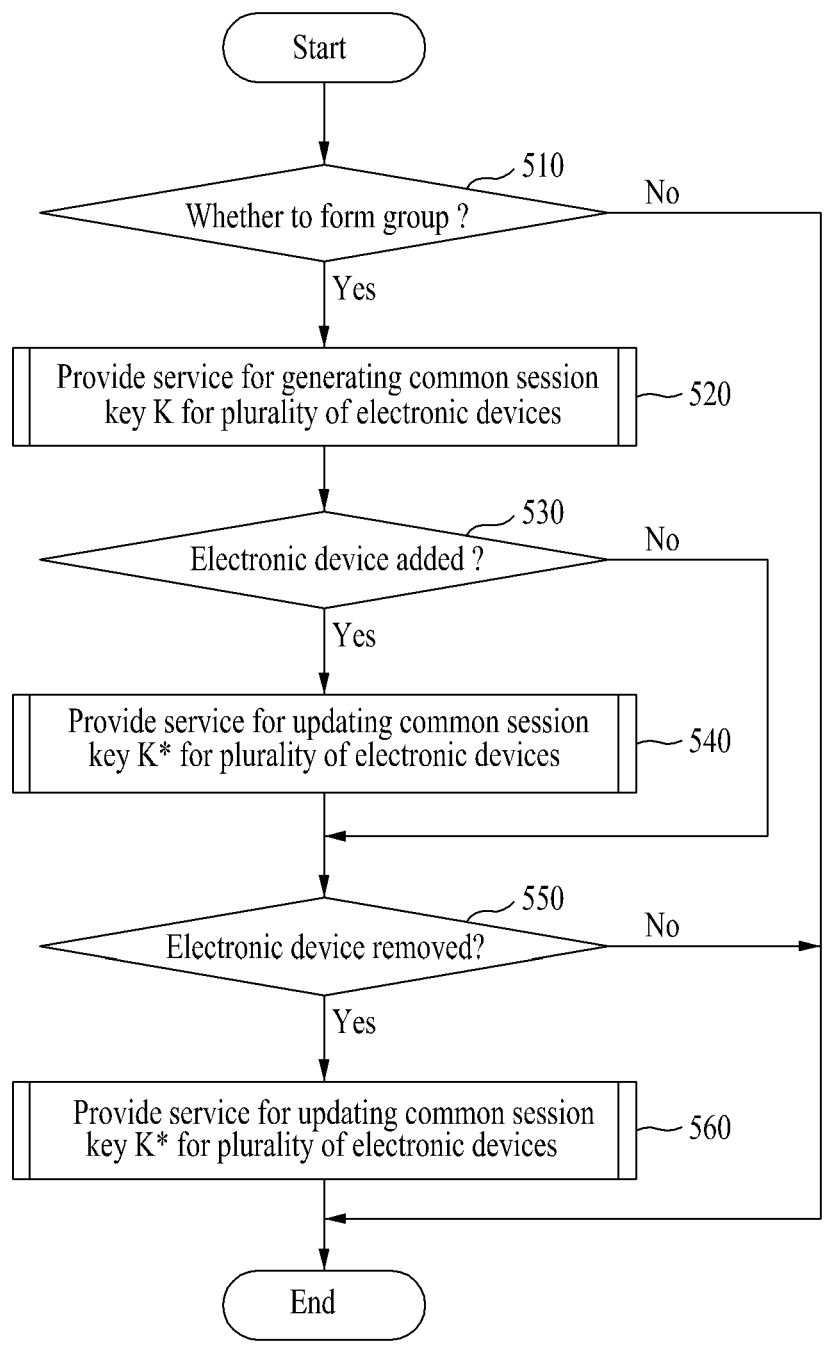
FIG. 5 is a diagram illustrating an operating method of a server according to a first embodiment.

FIG. 5 is a diagram illustrating an operating method of the server 120 according to a first embodiment.

Referring to FIG. 5, at operation 510, the server 120 may detect a plurality of electronic devices, that is, N electronic devices 110 attempting to form a group. In response to the detection, at operation 520, the server 120 may provide a service for generating a group key of the electronic devices 110, that is, a common session key K. Accordingly, the N electronic devices 110 may be grouped to perform communication using the group key that is the session key K.

Figure 6:
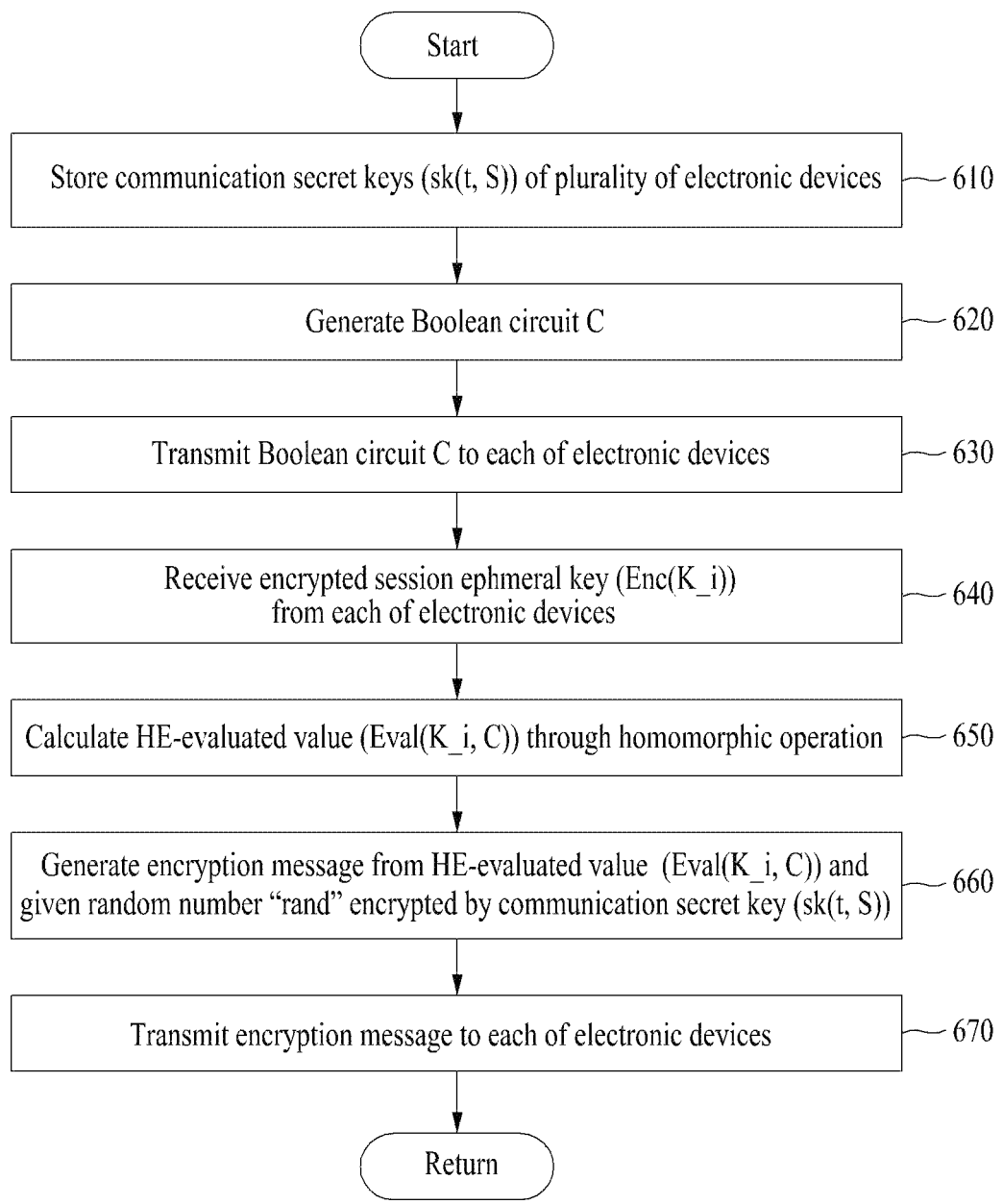
FIG. 6 is a diagram illustrating a service provision operation for generating a group key in FIG. 5.

FIG. 6 is a diagram illustrating a service provision operation for generating a group key in FIG. 5.

Referring to FIG. 6, at operation 610, the server 120 may store secret keys, that is, communication secret keys (sk(t, S)) for communication with a plurality of electronic devices, that is, N electronic devices 110. In this case, the server 120 may store the communication secret key (sk(t, S)) for each electronic device, for example, a t-th electronic device 110.

At operation 620, the server 120 may generate a Boolean circuit C. The server 120 may generate the Boolean circuit C having a structure for performing an operation based on the number of electronic devices 110, that is, N input values. For example, the server 120 may generate the Boolean circuit C having a structure, such as that illustrated in FIG. 2B. In this case, a middle operator of the Boolean circuit C may include an XOR/AND operator. Thereafter, at operation 630, the server 120 may transmit the Boolean circuit C to each of the electronic devices 110.

At operation 640, the server 120 may receive an encrypted session ephemeral key (Enc(K_i)) from each of the electronic devices 110. Each of the electronic devices 110 may generate each of the encrypted session ephemeral keys (Enc(K_i)) by encrypting each of the session ephemeral keys (K_i) based on an algorithm for HE. In response thereto, at operation 650, the server 120 may calculate an HE-evaluated value (Eval(K_i, C)) through a homomorphic operation. The server 120 may calculate the HE-evaluated value (Eval(K_i, C)) by applying the encrypted session ephemeral keys (Enc(K_i)) as the input values of the Boolean circuit C.

At operation 660, the server 120 may generate an encryption message for each of the electronic devices 110 based on the HE-evaluated value (Eval(K_i, C)) and a given random number "rand." In this case, the server 120 may generate an encryption message for each of the electronic devices 110 by encrypting the given random number "rand" using the communication secret key (sk(t, S)) of each of the electronic devices 110 so that the message include the HE-evaluated value (Eval(K_i, C)) and the encrypted random number "rand." Thereafter, at operation 670, the server 120 may transmit the encryption message to each of the electronic devices 110. Thereafter, the server 120 may return to FIG. 5.

Referring back to FIG. 5, at operation 530, the server 120 may detect at least another electronic device, for example, an (N+1)-th electronic device 110 to be added to a group configured with a plurality of electronic devices, that is, N electronic devices 110. In response to the detection, at operation 540, the server 120 may provide a service for updating a group key, that is, a common session key (K*) of the electronic devices 110, that is, the (N+1) electronic devices 110. Accordingly, the (N+1) electronic devices 110 may be grouped to perform communication using the group key, that is, the session key (K*).

Figure 7:
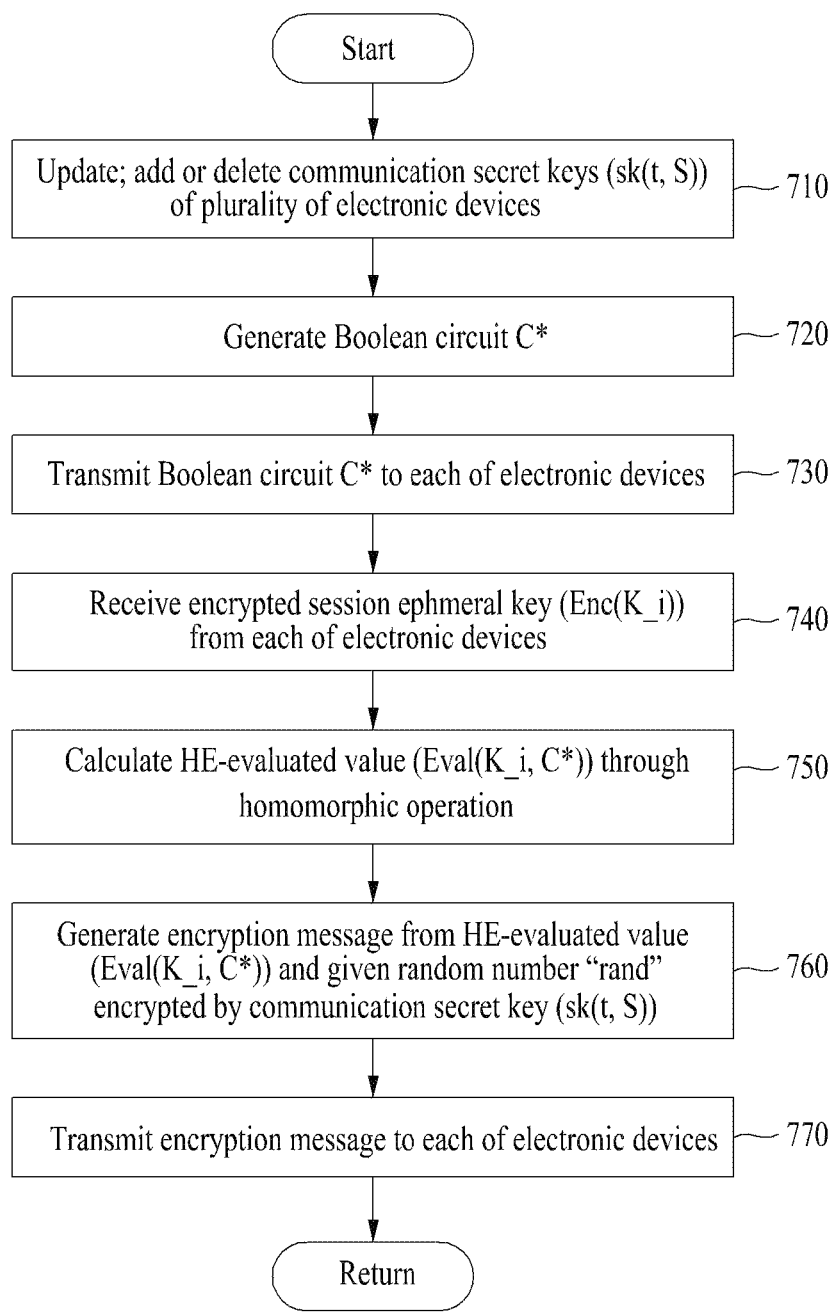
FIG. 7 is a diagram illustrating a service provision operation for the update of a group key in FIG. 5.

FIG. 7 is a diagram illustrating a service provision operation for the update of a group key in FIG. 5.

Referring to FIG. 7, at operation 710, the server 120 may update previously stored communication secret keys (sk(t, S)). In this case, the server 120 may additionally store a communication secret key (sk(N+1, S)) of at least another electronic device, for example, an (N+1)-th electronic device 110.

At operation 720, the server 120 may generate a Boolean circuit C*. In this case, the server 120 may generate the Boolean circuit C* having a structure for performing an operation based on input values corresponding to the number of electronic devices 110, that is, electronic devices 110 within a group and another electronic device 110. For example, the server 120 may generate the Boolean circuit C* having a structure, such as that illustrated in FIG. 3B. In this case, the server 120 may generate the Boolean circuit C* so that the depth of the Boolean circuit C* is minimized. A middle operator of the Boolean circuit C* may include an XOR/AND operator. Accordingly, the server 120 may update a previously generated Boolean circuit C with the Boolean circuit C*. Thereafter, at operation 730, the server 120 may transmit the Boolean circuit C* to each of the electronic devices 110.

At operation 740, the server 120 may receive an encrypted session ephemeral key (Enc(K_i)) from each of the electronic devices 110. At this time, each of the electronic devices 110 may generate each of the encrypted session ephemeral keys (Enc(K_i)) by encrypting each of session ephemeral keys (K_i) based on an algorithm for HE. In response to the detection, at operation 750, the server 120 may calculate an HE-evaluated value (Eval(K_i, C*)) through a homomorphic operation. The server 120 may calculate the HE-evaluated value (Eval(K_i, C*)) by applying the encrypted session ephemeral keys (Enc(K_i)) as the input values of the Boolean circuit C.

At operation 760, the server 120 may generate an encryption message for each of the electronic devices 110 based on the HE-evaluated value (Eval(K_i, C*)) and a given random number "rand*." In this case, the server 120 may generate the encryption message for each of the electronic devices 110 by encrypting the given random number "rand*" using the communication secret key (sk(t, S)) of each of the electronic devices 110 so that the message includes the HE-evaluated value (Eval(K_i, C*)) and the encrypted random number "rand*." Thereafter, at operation 770, the server 120 may transmit the encryption message to each of the electronic devices 110. Thereafter, the server 120 may return to FIG. 5.

Referring back to FIG. 5, at operation 550, the server 120 may detect at least one electronic device, for example, an N-th electronic device 110 removed from the group configured with a plurality of electronic devices, that is, the N electronic devices 110. In response to the detection, at operation 560, the server 120 may provide a service for updating a group key, that is, the common session key (K*) of electronic devices 110, that is, the (N−1) electronic devices 110. Accordingly, the (N−1) electronic devices 110 may be grouped to perform communication using the group key, that is, the session key (K*).

FIG. 7 is a diagram illustrating a service provision operation for the update of a group key in FIG. 5.

Referring to FIG. 7, the server 120 may operate similarly to that described with reference to FIG. 7. However, at operation 710, the server 120 may update previously stored communication secret keys (sk(t, S)). In this case, the server 120 may delete a communication secret key (sk(N, S)) of at least one electronic device, for example, an N-th electronic device 110. Furthermore, at operation 720, the server 120 may generate a Boolean circuit C*. In this case, the server 120 may generate the Boolean circuit C* having a structure for performing an operation based on input values corresponding to the number of electronic devices 110, that is, the number of electronic devices 110 within a group. For example, the server 120 may generate the Boolean circuit C* having a structure, such as that illustrated in FIG. 4B. In this case, a middle operator of the Boolean circuit C* may include an XOR/AND operator. Accordingly, the server 120 may update a previously generated Boolean circuit C with the Boolean circuit C*. Thereafter, at operation 730, the server 120 may transmit the Boolean circuit C* to each of the electronic devices 110. Furthermore, the server 120 may return to FIG. 5 after performing operation 740, operation 750, operation 760 and operation 770.

Figure 8:
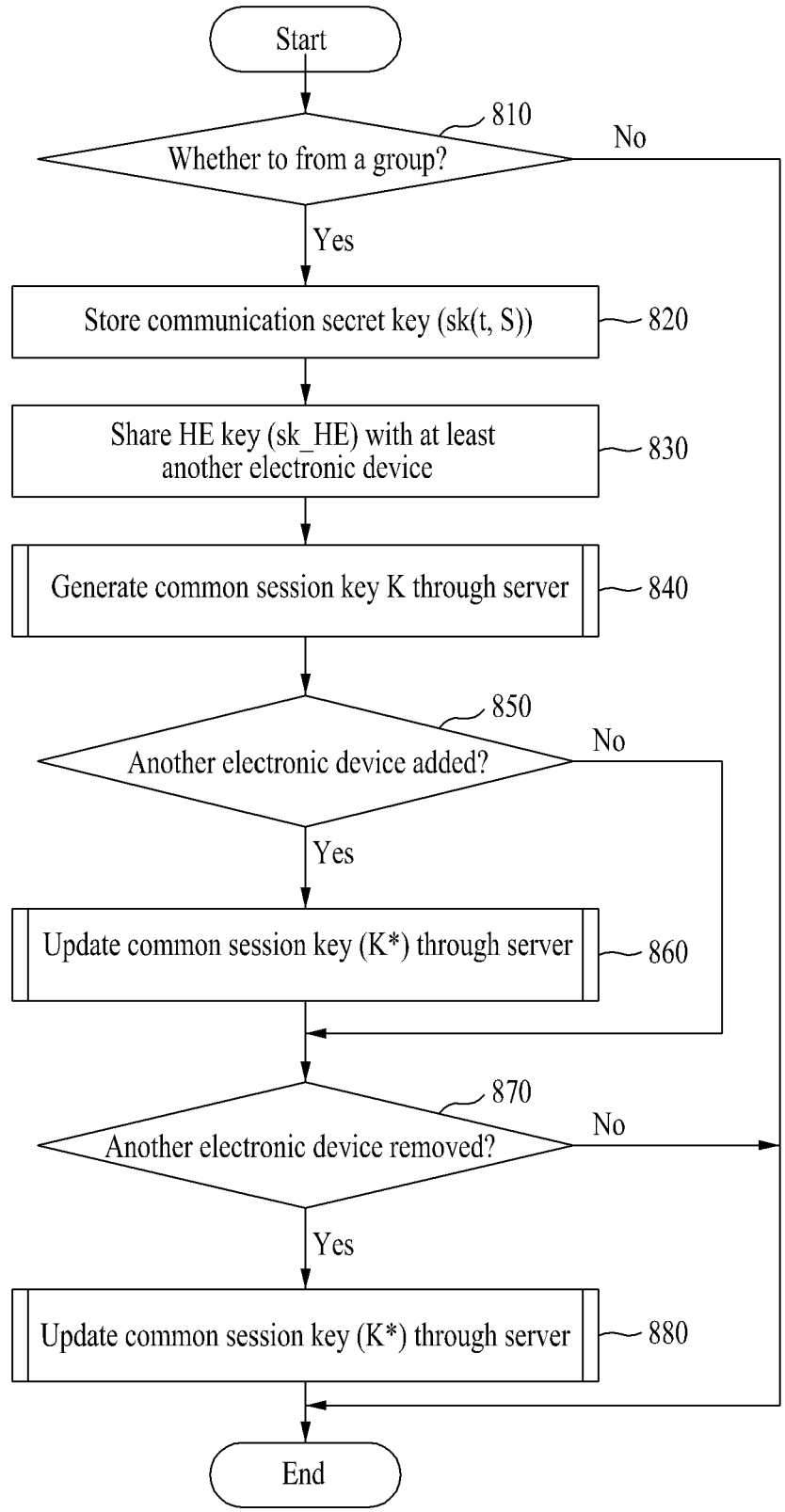
FIG. 8 is a diagram illustrating an operating method of an electronic device according to a first embodiment.

FIG. 8 is a diagram illustrating an operating method of the electronic device 110 according to a first embodiment.

Referring to FIG. 8, at operation 810, the electronic device 110 may detect at least another electronic device, that is, an (N−1) electronic device 110 attempting to form a group along with the electronic device 110. In response to the detection, at operation 820, the electronic device 110 may store a secret key, that is, a communication secret key (sk(t, S)) for communication with the server 120. Furthermore, at operation 830, the electronic device 110 may share the HE key with another electronic device 110. In this case, the HE key may include at least one of a homomorphic secret key (sk_HE) or a homomorphic public key (pk_HE). In this case, the HE key, particularly, the homomorphic secret key (sk_HE) may not be exposed to the server 120. Thereafter, at operation 840, the electronic device 110 may generate a group key, that is, a common session key K, through the server 120. Accordingly, the electronic device 110 may be grouped with other electronic devices, that is, the (N−1) electronic devices 110, and thus may perform communication using the group key, that is, the session key K.

Figure 9:
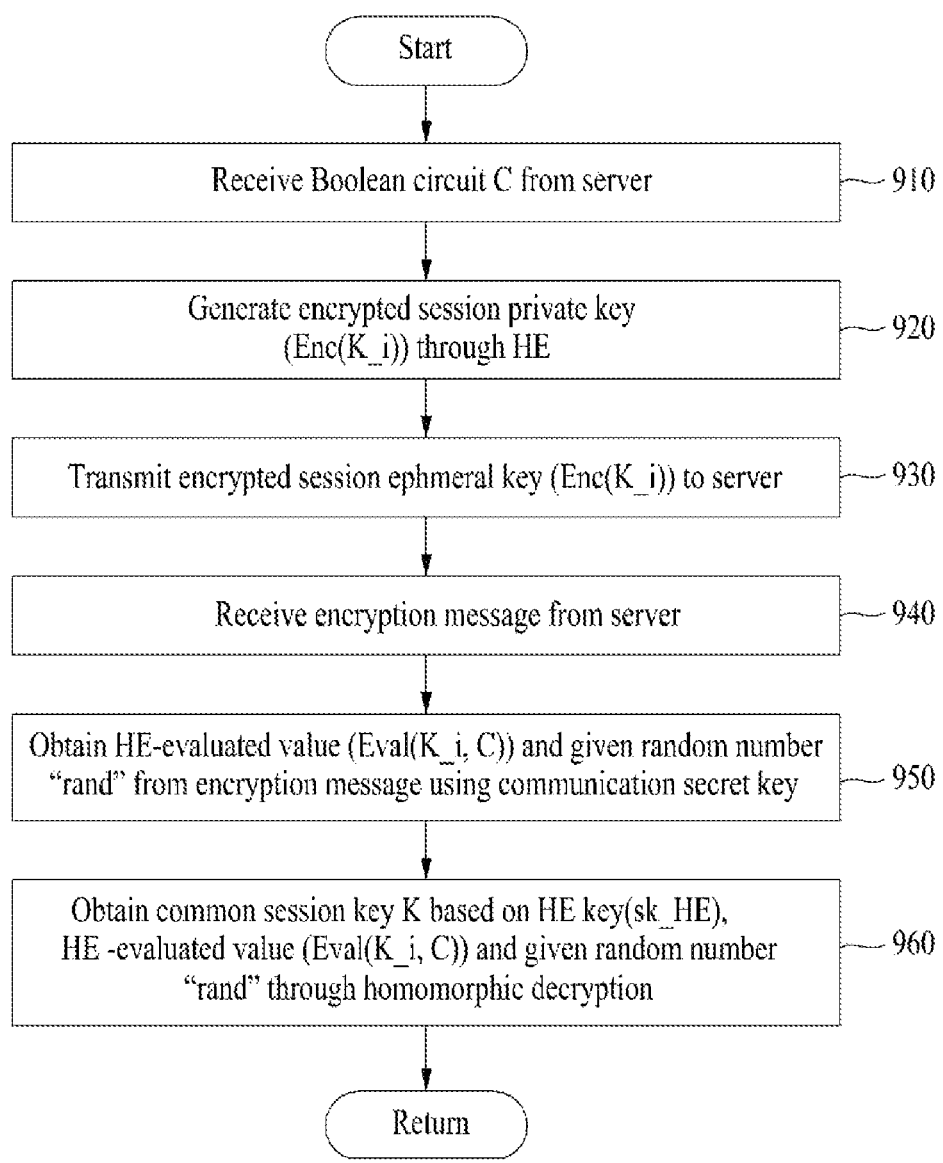
FIG. 9 is a diagram illustrating an operation of generating a group key and an operation of updating a group key in FIG. 8.

FIG. 9 is a diagram illustrating an operation of generating a group key in FIG. 8.

Referring to FIG. 9, at operation 910, the electronic device 110 may receive a Boolean circuit C from the server 120. For example, the Boolean circuit C may have a structure, such as that illustrated in FIG. 2B. In this case, a middle operator of the Boolean circuit C may include an XOR/AND operator.

At operation 920, the electronic device 110 may generate an encrypted session ephemeral key (Enc(K_i)) through HE. In this case, the electronic device 110 may generate the encrypted session ephemeral key (Enc(K_i)) by encrypting a homomorphic public key (pk_HE) and a session ephemeral key (K_i) based on an algorithm for HE. Thereafter, at operation 930, the electronic device 110 may transmit the encrypted session ephemeral key (Enc(K_i)) to the server 120.

At operation 940, the electronic device 110 may receive an encryption message from the server 120. At operation 950, the electronic device 110 may obtain an HE-evaluated value (Eval(K_i, C)) and a given random number "rand" from the encryption message. In this case, the electronic device 110 may decrypt the encrypted random number "rand" within the encryption message using a communication secret key (sk(t, S)), and thus may obtain the HE-evaluated value (Eval(K_i, C)) and the given random number "rand."

At operation 960, the electronic device 110 may obtain a group key, that is, a session key K, based on an HE key, the HE-evaluated value (Eval(K_i, C)) and the given random number "rand" through homomorphic decryption. At this time, the electronic device 110 may obtain a homomorphic decryption value (TK, Dec(Eval(K_i, C), sk_HE)) from a homomorphic secret key (sk_HE) and the HE-evaluated value (Eval(K_i, C)) through the homomorphic decryption. Thereafter, the electronic device 110 may obtain a session key (K=TK+rand) by adding the homomorphic decryption value and the given random number "rand." Thereafter, the electronic device 110 may return to FIG. 8.

Referring back to FIG. 8, at operation 850, the electronic device 110 may detect at least another electronic device, for example, an (N+1)-th electronic device 110 to be added to the group. In response to the detection, at operation 860, the electronic device 110 may update the group key, that is, the common session key (K*) through the server 120. Accordingly, the electronic device 110 may be grouped with other electronic devices, that is, the N electronic devices 110, and thus may perform communication using the group key, that is, the session key (K*).

Figure 10:
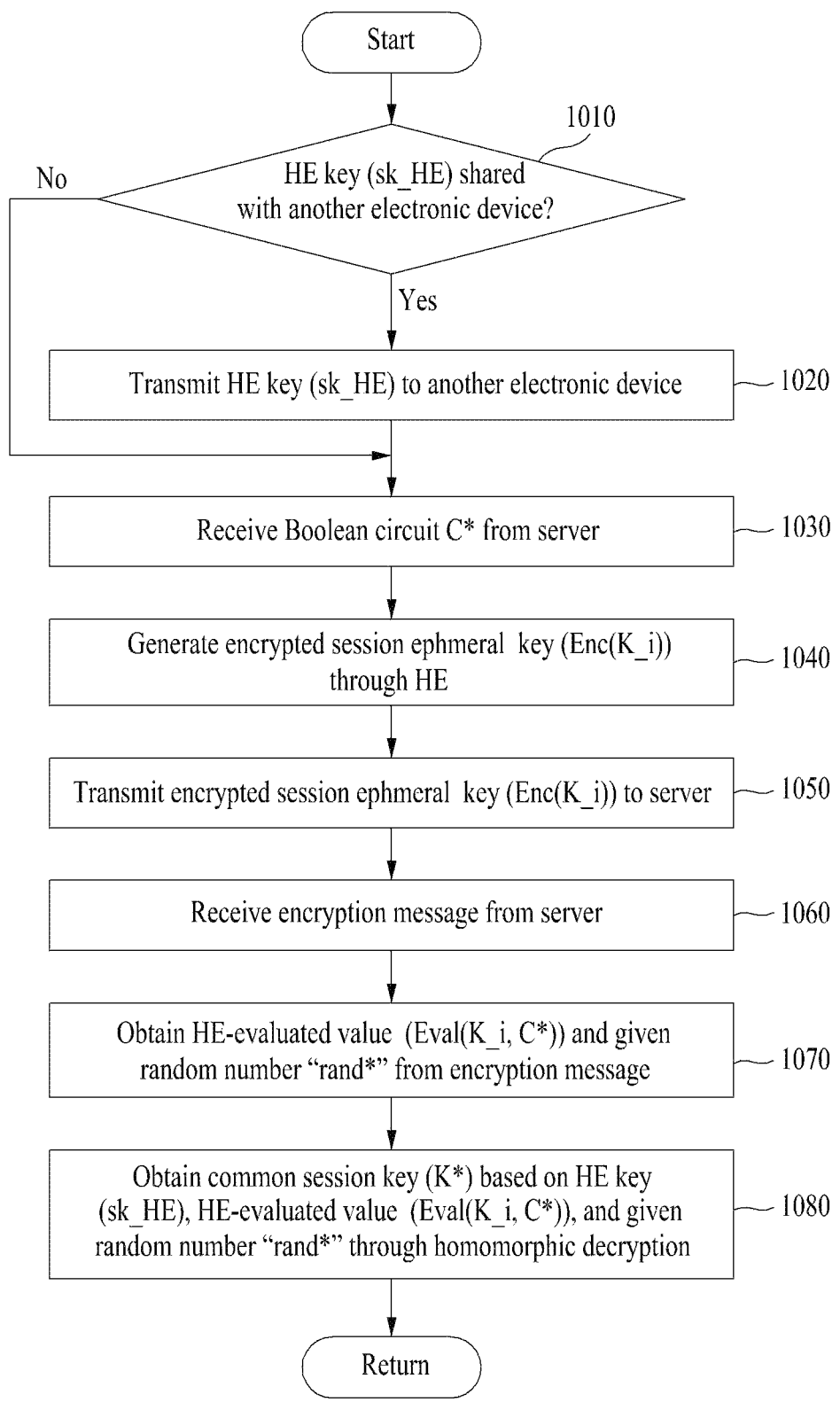
FIG. 10 is a diagram illustrating an operation of updating a group key in FIG. 8.

FIG. 10 is a diagram illustrating an operation of updating a group key in FIG. 8.

Referring to FIG. 10, at operation 1010, the electronic device 110 may receive a request for transmitting an HE key to at least another electronic device, for example, an (N+1)-th electronic device 110. In this case, the HE key may include at least one of a homomorphic secret key (sk_HE) or a homomorphic public key (pk_HE). For example, the request may be received from any one of other electronic devices 110 within a group. At operation 1020, the electronic device 110 may transmit the HE key to at least another electronic device, for example, the (N+1)-th electronic device 110. In this case, the HE key, particularly, the homomorphic secret key (sk_HE) may not be exposed to the server 120. In this case, although the request is not received at operation 1010, the electronic device 110 may proceed to operation 1030.

At operation 1030, the electronic device 110 may receive a Boolean circuit C* from the server 120. For example, the Boolean circuit C* may have a structure, such as that illustrated in FIG. 3B. In this case, a middle operator of the Boolean circuit C* may include an XOR/AND operator.

At operation 1040, the electronic device 110 may generate an encrypted session ephemeral key (Enc(K_i)) through HE. In this case, the electronic device 110 may generate the encrypted session ephemeral key (Enc(K_i)) by encrypting a homomorphic public key (pk_HE) and a session ephemeral key (K_i) based on an algorithm for HE. Thereafter, at operation 1050, the electronic device 110 may transmit the encrypted session ephemeral key (Enc(K_i)) to the server 120.

At operation 1060, the electronic device 110 may receive an encryption message from the server 120. At operation 1070, the electronic device 110 may obtain an HE-evaluated value (Eval(K_i, C*)) and a given random number "rand*" from the encryption message. In this case, the electronic device 110 may decrypt the encrypted random number "rand*" within the encryption message using a communication secret key (sk(t, S)), and thus may obtain the HE-evaluated value (Eval(K_i, C*)) and the given random number "rand*."

At operation 1080, the electronic device 110 may obtain a group key, that is, a session key K, based on the HE key, the HE-evaluated value (Eval(K_i, C*)) and the given random number "rand*" through homomorphic decryption.

At this time, the electronic device 110 may obtain a homomorphic decryption value (TK*, Dec(Eval(K_i, C*), sk_HE)) from the homomorphic secret key (sk_HE) and the HE-evaluated value (Eval(K_i, C*)) through the homomorphic decryption. Thereafter, the electronic device 110 may obtain a session key (K=TK*+rand*) by adding the homomorphic decryption value and the given random number "rand*." Thereafter, the electronic device 110 may return to FIG. 8.

Referring back to FIG. 8, at operation 870, the electronic device 110 may detect at least another electronic device, for example, an N-th electronic device 110 removed from the group. In response to the detection, at operation 880, the electronic device 110 may update the group key, that is, the common session key (K*) through the server 120. Accordingly, the electronic device 110 may be grouped with other electronic devices, that is, the (N−2) electronic devices 110, and may perform communication using the group key, that is, the session key (K*).

FIG. 9 is a diagram illustrating an operation of updating a group key in FIG. 8.

Referring to FIG. 9, the electronic device 110 may operate similarly to that described with reference to FIG. 9. However, at operation 910, the electronic device 110 may receive a Boolean circuit C* from the server 120. For example, the Boolean circuit C* may have a structure, such as that illustrated in FIG. 4B. In this case, a middle operator of the Boolean circuit C* may include an XOR/AND operator. Furthermore, at operation 950, the electronic device 110 may obtain an HE-evaluated value (Eval(K_i, C*)) and a given random number "rand*" from the encryption message using a communication secret key (sk(t, S)). Accordingly, at operation 960, the electronic device 110 may obtain a group key, that is, a session key K, based on an HE key, the HE-evaluated value (Eval(K_i, C*)) and the given random number "rand*" through homomorphic decryption. At this time, the electronic device 110 may obtain a homomorphic decryption value (TK*, Dec(Eval(K_i, C*), sk_HE)) from the homomorphic secret key (sk_HE) and the HE-evaluated value (Eval(K_i, C*)) through the homomorphic decryption. Thereafter, the electronic device 110 may obtain a session key (K=TK*+rand*) by adding the homomorphic decryption value and the given random number "rand*." Thereafter, the electronic device 110 may return to FIG. 8.

The communication system 100 according to a first embodiment may include a plurality of electronic devices 110 configured to share an HE key in order to form a group and the server 120 configured to generate a Boolean circuit C for performing an operation based on input values corresponding to the number of electronic devices 110.

According to the first embodiment, the server 120 may be configured to receive an encrypted session ephemeral key (Enc(K_i)) from each of the electronic devices 110 through HE, calculate an HE-evaluated value (Eval(K_i, C)) by applying the encrypted session ephemeral keys (Enc(K_i)) as the input values of the Boolean circuit C, and transmit the HE-evaluated value (Eval(K_i, C)) and a given random number "rand" to each of the electronic devices 110.

According to the first embodiment, each of the electronic devices 110 may be configured to generate a common session key K for a group based on the HE key, the HE-evaluated value (Eval(K_i, C)) and the given random number "rand" through homomorphic decryption.

According to the first embodiment, the HE key may include at least one of a homomorphic secret key (sk_HE) or a homomorphic public key (pk_HE).

According to the first embodiment, the encrypted session ephemeral key (Enc(K_i)) may be generated from the homomorphic public key (pk_HE) and the session ephemeral key (K_i) of each of the electronic devices 110 through HE.

According to the first embodiment, each of the electronic devices 110 may be configured to obtain a homomorphic decryption value (TK, Dec(Eval(K_i, C), sk_HE)) by decrypting the homomorphic secret key (sk_HE) and the HE-evaluated value (Eval(K_i, C)) through homomorphic decryption and to obtain a session key K by adding the homomorphic decryption value (TK, Dec(Eval(K_i, C), sk_HE)) and the given random number "rand."

According to the first embodiment, the server 120 may be configured to encrypt the given random number "rand" using a communication secret key (sk(t, S)), to generate an encryption message including the HE-evaluated value (Eval(K_i, C)) and the encrypted random number "rand", and to transmit the encryption message to each of the electronic devices 110.

According to the first embodiment, each of the electronic devices 110 may be configured to obtain the HE-evaluated value (Eval(K_i, C)) and the given random number "rand" by decrypting the encrypted random number "rand" within the encryption message using the communication secret key (sk(t, S)).

According to the first embodiment, the server 120 may be configured to detect at least another electronic device 110 to be added to a group, update a Boolean circuit C* based on the electronic devices 110 and another electronic device 110, receive another encrypted session ephemeral key (Enc(K_i)) from each of the electronic devices 110 and another electronic device 110 through HE, calculate another HE-evaluated value (Eval(K_i, C*)) by applying another encrypted session ephemeral key (Enc(K_i)) as the input values of the Boolean circuit C*, and transmit another HE-evaluated value (Eval(K_i, C*)) and another given random number "rand*" to each of the electronic devices 110 and another electronic device 110 using the communication secret key (sk(t, S)) of each of the electronic devices 110 and another electronic device 110.

According to the first embodiment, at least any one of the electronic devices 110 may provide an HE key to another electronic device 110.

According to the first embodiment, each of the electronic devices 110 and another electronic device 110 may be configured to generate a common session key (K*) for a group again based on the HE key, another HE-evaluated value (Eval(K_i, C*)) and another given random number "rand*" through HE.

According to the first embodiment, the server 120 may be configured to detect any one of the electronic devices 110 removed from the group, update the Boolean circuit C* based on the number of remaining electronic devices among the electronic devices 110, receive other encrypted session ephemeral keys (Enc(K_i)) from the remaining electronic devices 110 through HE, calculate another HE-evaluated value (Eval(K_i, C*)) by applying other encrypted session ephemeral keys (Enc(K_i)) as the input values of the Boolean circuit C*, and transmit another HE-evaluated value (Eval(K_i, C*)) and another given random number "rand*" to each of the remaining electronic devices 110 using the communication secret key (sk(t, S)) of each of the remaining electronic devices 110.

According to the first embodiment, each of the remaining electronic devices 110 may be configured to generate a common session key (K*) for a group again based on the HE key, another HE-evaluated value (Eval(K_i, C*)) and another given random number "rand*" through homomorphic decryption.

An operating method of the communication system 110 according to a first embodiment may include an operation of sharing, by a plurality of electronic devices 110 for forming a group, an HE key, an operation of generating, by the server 120, a Boolean circuit C for performing an operation based on input values corresponding to the number of electronic devices 110, an operation of transmitting, by each of the electronic devices 110, an encrypted session ephemeral key (Enc(K_i)) to the server 120 through HE, an operation of calculating, by the server 120, an HE-evaluated value (Eval(K_i, C)) by applying the encrypted session ephemeral keys (Enc(K_i)) as the input values of the Boolean circuit C, an operation of transmitting, by the server 120, the HE-evaluated value (Eval(K_i, C)) and a given random number "rand" to each of the electronic devices 110, and an operation of generating, by each of the electronic devices 110, a common session key K for a group based on the HE key, the HE-evaluated value (Eval(K_i, C)) and the given random number "rand" through homomorphic decryption.

According to the first embodiment, the HE key may include at least one of a homomorphic secret key (sk_HE) or a homomorphic public key (pk_HE).

According to the first embodiment, the encrypted session ephemeral key (Enc(K_i)) may be generated from the homomorphic public key (pk_HE) and the session ephemeral key (K_i) of each of the electronic devices 110 through HE.

According to the first embodiment, the operation of generating the session key K may include an operation of obtaining a homomorphic decryption value (TK, Dec(Eval(K_i, C), sk_HE)) based on the homomorphic secret key (sk_HE) and the HE-evaluated value (Eval(K_i, C)) through HE and an operation of obtaining the session key K by adding the homomorphic decryption value (TK, Dec(Eval(K_i, C), sk_HE)) and a given random number "rand."

According to the first embodiment, the operation of transmitting the HE-evaluated value (Eval(K_i, C)) and the given random number "rand" may include an operation of encrypting the given random number "rand" using a communication secret key (sk(t, S)) and generating an encryption message including the HE-evaluated value (Eval(K_i, C)) and the encrypted random number "rand", and an operation of transmitting the encryption message to each of the electronic devices 110.

According to the first embodiment, the operation of generating the session key K may further include an operation of obtaining the HE-evaluated value (Eval(K_i, C)) and the given random number "rand" by decrypting the encrypted random number "rand" within the encryption message using the communication secret key (sk(t, S)).

According to the first embodiment, the operating method of the communication system 110 may further include an operation of detecting, by the server 120 and the electronic devices 110, at least another electronic device 110 to be added to the group, an operation of providing, by at least any one of the electronic devices 110, the HE key to another electronic device 110, and an operation of updating, by the server 120, the Boolean circuit C* based on the number of electronic devices 110 and another electronic device 110.

According to the first embodiment, each of the operation of transmitting the encrypted session ephemeral key (Enc(K_i)), the operation of calculating the HE-evaluated value (Eval(K_i, C)), the operation of transmitting the HE-evaluated value (Eval(K_i, C)) and the given random number "rand", and the operation of generating the session key K may be performed by the server 120 or the electronic devices 110 and another electronic device 110 again.

According to the first embodiment, the operating method of the communication system 110 may further include an operation of detecting, by the server 120, any one of the electronic devices 110 removed from the group and an operation of updating, by the server 120, the Boolean circuit C* based on the number of remaining electronic devices among the electronic devices 110.

According to the first embodiment, each of the operation of transmitting the encrypted session ephemeral key (Enc(K_i)), the operation of calculating the HE-evaluated value (Eval(K_i, C)), the operation of transmitting the HE-evaluated value (Eval(K C)) and the given random number "rand", and the operation of generating the session key K may be performed by the server 120 or each of the remaining electronic devices 110 again.

Figure 11:
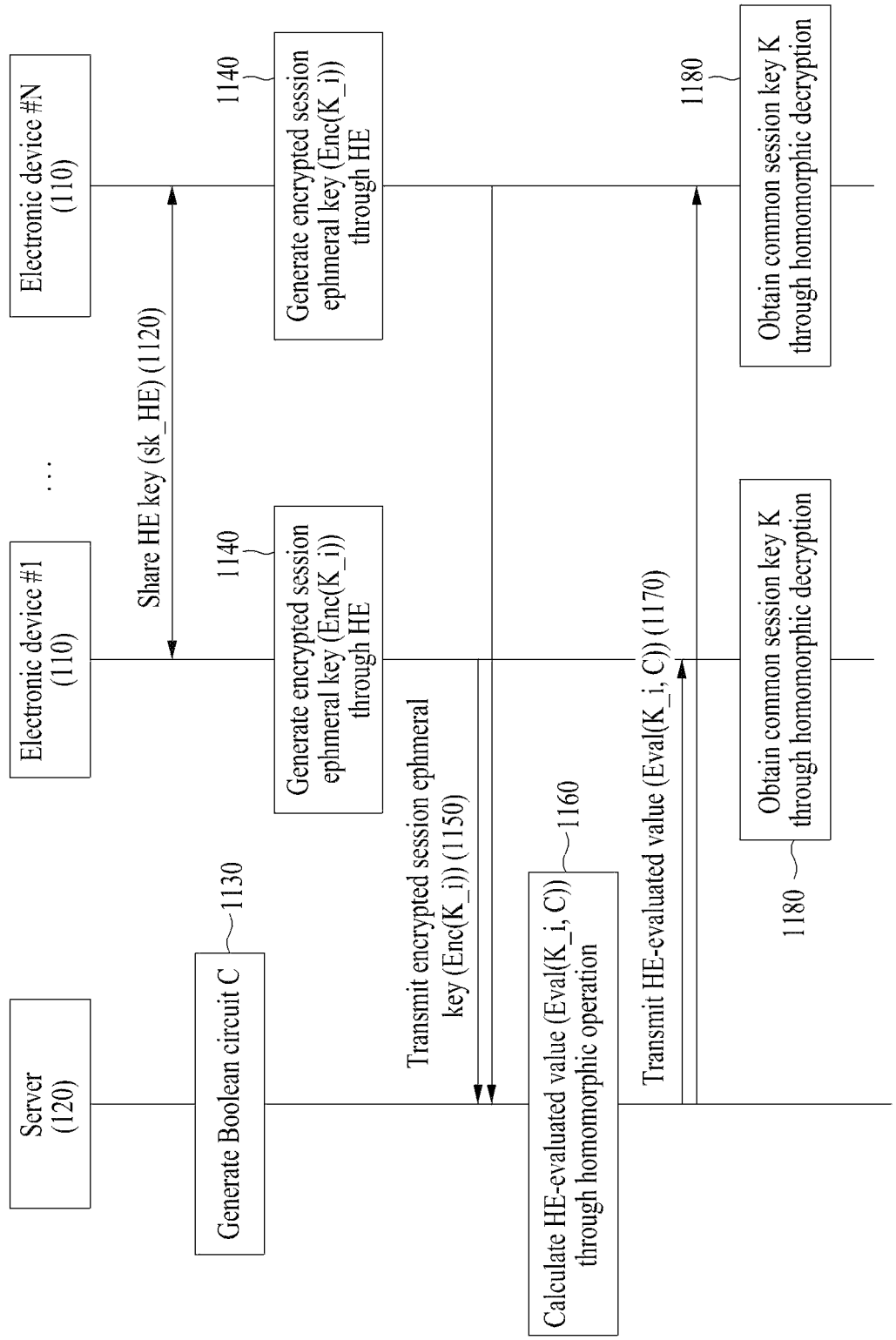
FIG. 11 is a diagram illustrating an operating method of a communication system according to a second embodiment.

FIG. 11 is a diagram illustrating an operating method of the communication system 100 according to a second embodiment.

Referring to FIG. 11, at operation 1120, a plurality of electronic device, that is, N electronic devices 110 attempting to form a group, may share an HE key. In this case, the HE key may include at least one of a homomorphic secret key (sk_HE) or a homomorphic public key (pk_HE). In this case, the HE key, particularly, the homomorphic secret key (sk_HE) may not be exposed to the server 120.

At operation 1130, the server 120 may generate a Boolean circuit C. The server 120 may generate the Boolean circuit C having a structure for performing an operation based on input values corresponding to the number of electronic devices 110. For example, the server 120 may generate the Boolean circuit C having a structure, such as that illustrated in FIG. 2B. In this case, a middle operator of the Boolean circuit C may include an XOR/AND operator.

At operation 1140, each of the electronic devices 110 may generate an encrypted session ephemeral keys (Enc(K_i)) through HE. Each of the electronic devices 110 may generate each of the encrypted session ephemeral keys (Enc(K_i)) by encrypting the homomorphic public key (pk_HE) and each of session ephemeral keys (K_i) based on an algorithm for HE. Thereafter, at operation 1150, each of the electronic devices 110 may transmit each of the encrypted session ephemeral keys (Enc(K_i)) to the server 120.

At operation 1160, the server 120 may calculate an HE-evaluated value (Eval(K_i, C)) through a homomorphic operation. The server 120 may calculate the HE-evaluated value (Eval(K_i, C)) by applying the encrypted session ephemeral keys (Enc(K_i)) as the input values of the Boolean circuit C. Thereafter, at operation 1170, the server 120 may transmit the HE-evaluated value (Eval(K_i, C)) to each of the electronic devices 110.

At operation 1180, the electronic devices 110 may generate a group key, that is, a common session key K through homomorphic decryption. Each of the electronic devices 110 may generate the session key K based on the HE key and the HE-evaluated value (Eval(K_i, C)). Accordingly, the N electronic devices 110 may be grouped to perform communication using the group key, that is, the session key K.

Figure 12:
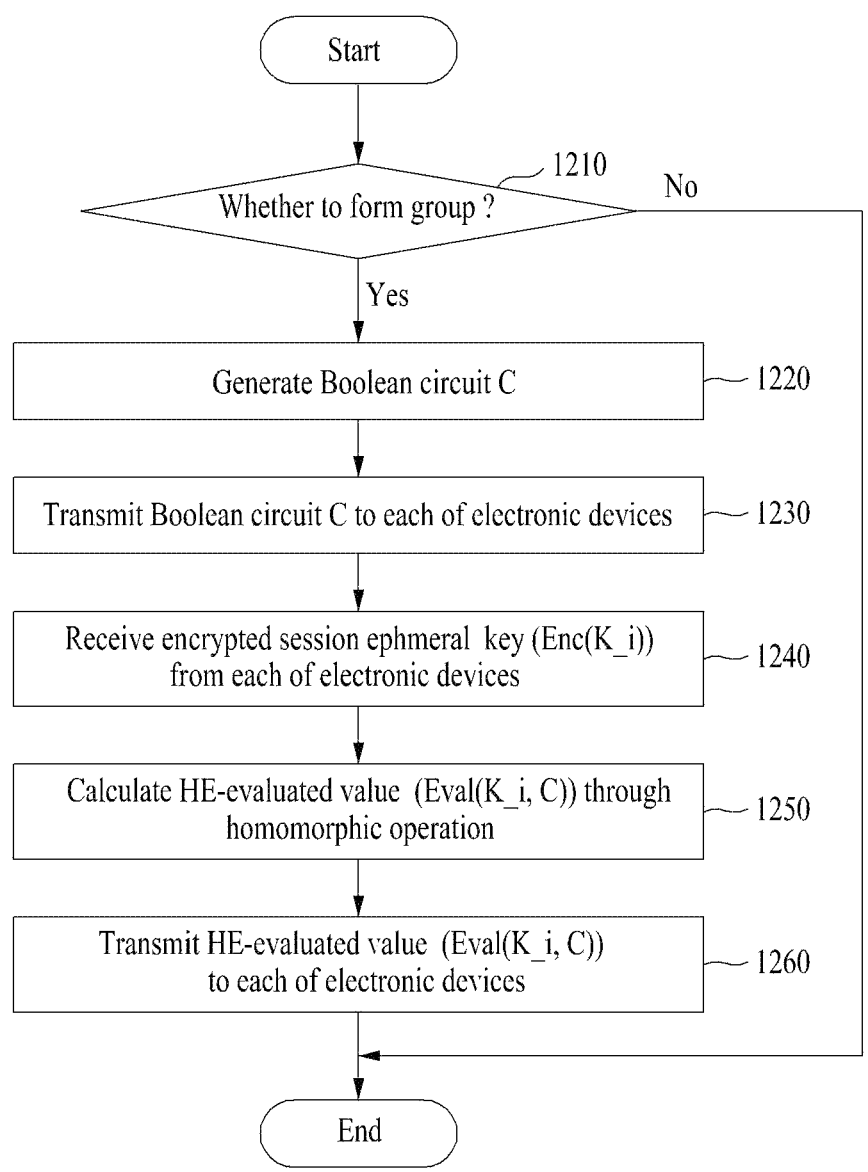
FIG. 12 is a diagram illustrating an operating method of a server according to a second embodiment.

FIG. 12 is a diagram illustrating an operating method of the server 120 according to a second embodiment.

Referring to FIG. 12, at operation 1210, the server 120 may detect a plurality of electronic devices, that is, N electronic devices 110 attempting to form a group. Thereafter, at operation 1220, the server 120 may generate a Boolean circuit C. The server 120 may generate the Boolean circuit C having a structure for performing an operation based on the number of electronic devices 110, that is, N input values. For example, the server 120 may generate the Boolean circuit C having a structure, such as that illustrated in FIG. 2B. In this case, a middle operator of the Boolean circuit C may include an XOR/AND operator. Thereafter, at operation 1230, the server 120 may transmit the Boolean circuit C to each of the electronic devices 110.

At operation 1240, the server 120 may receive an encrypted session ephemeral key (Enc(K_i)) from each of the electronic devices 110. Each of the electronic devices 110 may generate each of the encrypted session ephemeral keys (Enc(K_i)) by encrypting each of session ephemeral keys (K_i) based on an algorithm for HE. In response thereto, at operation 1250, the server 120 may calculate an HE-evaluated value (Eval(K_i, C)) through a homomorphic operation. The server 120 may calculate the HE-evaluated value (Eval(K_i, C)) 을 by applying the encrypted session ephemeral keys (Enc(K_i)) as the input values of the Boolean circuit C. Thereafter, at operation 1260, the server 120 may transmit the HE-evaluated value (Eval(K_i, C)) to each of the electronic devices 110. Thereafter, the server 120 may return to FIG. 5. Accordingly, the N electronic devices 110 may be grouped to perform communication using the group key, that is, the session key K.

Figure 13:
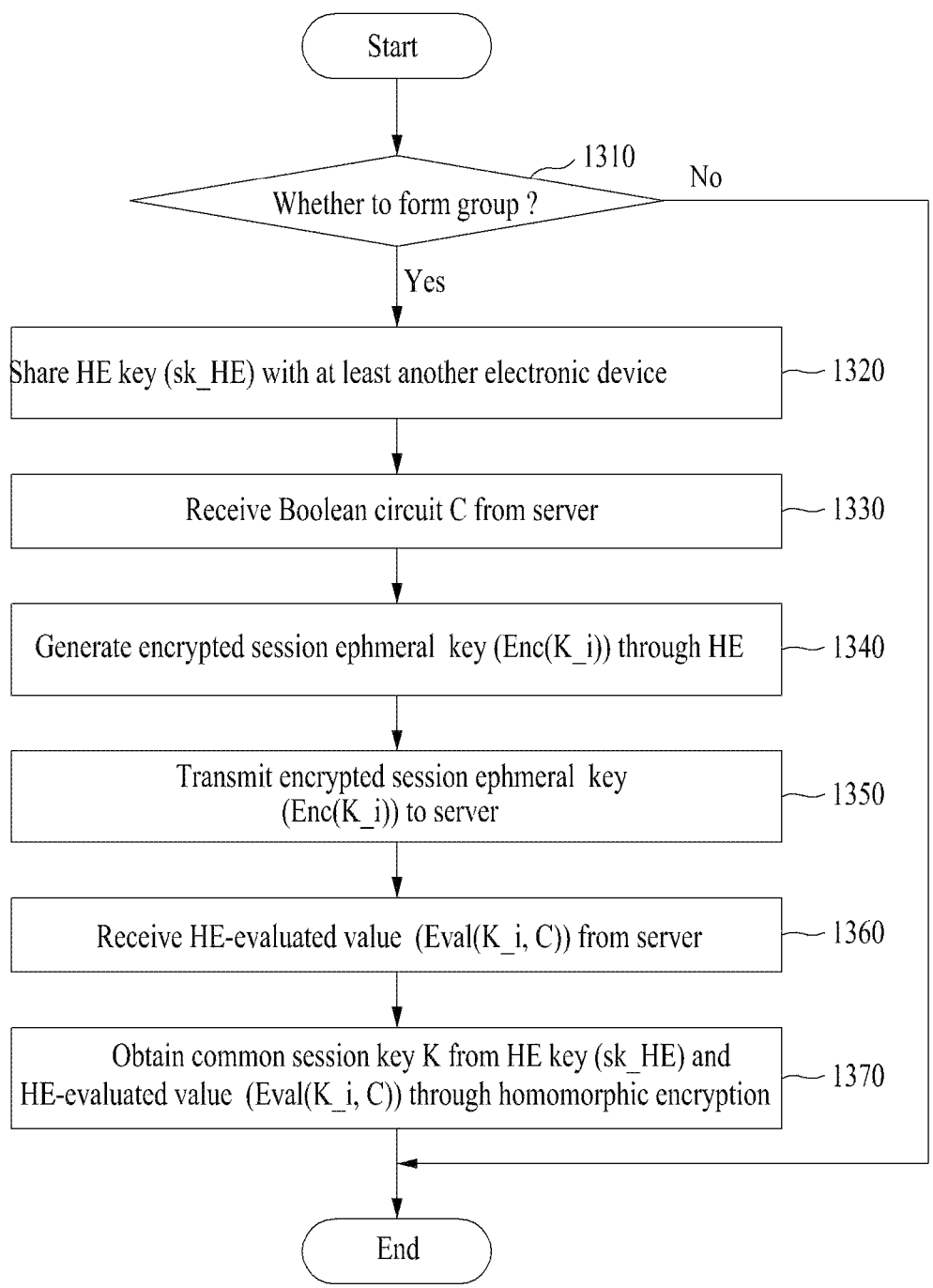
FIG. 13 is a diagram illustrating an operating method of an electronic device according to a second embodiment.

FIG. 13 is a diagram illustrating an operating method of the electronic device 110 according to a second embodiment.

Referring to FIG. 13, at operation 1310, the electronic device 110 may detect at least another electronic device, that is, (N−1) electronic devices 110 attempting to form a group along with the electronic device 110. Furthermore, at operation 1320, the electronic device 110 may share an HE key with another electronic device 110. In this case, the HE key may include at least one of a homomorphic secret key (sk_HE) or a homomorphic public key (pk_HE). In this case, the HE key, particularly, the homomorphic secret key (sk_HE) may not be exposed to the server 120.

At operation 1330, the electronic device 110 may receive a Boolean circuit C from the server 120. For example, the Boolean circuit C may have a structure, such as that illustrated in FIG. 2B. In this case, a middle operator of the Boolean circuit C may include an XOR/AND operator.

At operation 1340, the electronic device 110 may generate an encrypted session ephemeral key (Enc(K_i)) through HE. The electronic device 110 may generate the encrypted session ephemeral key (Enc(K_i)) by encrypting the homomorphic public key (pk_HE) and a session ephemeral key (K_i) based on an algorithm for HE. Thereafter, at operation 1350, the electronic devices 110 may transmit the encrypted session ephemeral key (Enc(K_i)) to the server 120.

At operation 1360, the electronic device 110 may receive an HE-evaluated value (Eval(K_i, C)) from the server 120. In response thereto, at operation 1370, the electronic device 110 may obtain a group key, that is, a session key K, from the HE key and the HE-evaluated value (Eval(K_i, C)) through homomorphic encryption. At this time, the electronic device 110 may obtain a session key (K, Dec(Eval (K_i, C), sk_HE)) from the homomorphic secret key (sk_HE) and the HE-evaluated value (Eval(K_i, C)) through the homomorphic encryption. Accordingly, the electronic device 110 may be grouped with other electronic devices, that is, the (N−1) electronic devices 110, to perform communication using the group key, that is, the session key K.

The communication system 100 according to the second embodiment may include a plurality of electronic devices 110 configured to share an HE key in order to form a group and the server 120 configured to generate a Boolean circuit C for performing an operation based on input values corresponding to the number of electronic devices 110.

According to the second embodiment, the server 120 may be configured to receive an encrypted session ephemeral key (Enc(K_i)) from each of the electronic devices 110 through HE, calculate an HE-evaluated value (Eval(K_i, C)) by applying the encrypted session ephemeral keys (Enc(K_i)) as the input values of the Boolean circuit C, and transmit HE-evaluated value (Eval(K_i, C)) to each of the electronic devices 110.

According to the second embodiment, each of the electronic devices 110 may be configured to generate a common session key K for the group based on the HE key and the HE-evaluated value (Eval(K_i, C)) through homomorphic decryption.

According to the second embodiment, the HE key may include at least one of a homomorphic secret key (sk_HE) or a homomorphic public key (pk_HE).

According to the second embodiment, the encrypted session ephemeral key (Enc(K_i)) may be generated from the homomorphic public key (pk_HE) and the session ephemeral key (K_i) of each of the electronic devices 110 through HE.

According to the second embodiment, the session key K may be generated from the homomorphic secret key (sk_HE) and the HE-evaluated value (Eval(K_i, C)) through homomorphic decryption.

An operating method of the communication system 100 according to the second embodiment may include an operation of sharing, by a plurality of electronic devices 110 for forming a group, an HE key, an operation of generating, by the server 120, a Boolean circuit C for performing an operation based on input values corresponding to the number of electronic devices 110, an operation of transmitting, by each of the electronic devices 110, an encrypted session ephemeral key (Enc(K_i)) to the server 120 through HE, an operation of calculating, by the server 120, an HE-evaluated value (Eval(K_i, C)) by applying the encrypted session ephemeral keys (Enc(K_i)) as the input values of the Boolean circuit C, an operation of transmitting, by the server 120, the HE-evaluated value (Eval(K_i, C)) to each of the electronic devices 110, and an operation of generating, by each of the electronic devices 110, a common session key K for the group based on the HE key and the HE-evaluated value (Eval(K_i, C)) through homomorphic decryption.

According to the second embodiment, the HE key may include at least one of a homomorphic secret key (sk_HE) or a homomorphic public key (pk_HE).

According to the second embodiment, the encrypted session ephemeral key (Enc(K_i)) may be generated from the homomorphic public key (pk_HE) and the session ephemeral key (K_i) of each of the electronic devices 110 through HE.

According to the second embodiment, the session key K may be generated from the homomorphic secret key (sk_HE) and the HE-evaluated value (Eval(K_i, C)) through homomorphic decryption.

According to various embodiments, the communication system 100 can enable the electronic devices 100 attempting to form a group to safely share a group key to be used for mutual communication between the electronic devices 110 using the HE scheme. In this case, the HE key used to generate the group key is not exposed to the server 120, and the electronic devices 110 can share the group key under the support of the server 120. That is, the group key is safely shared by the electronic devices 110 within the group, and may not be exposed to an element expect the electronic devices 110 within the group. According to one embodiment, the communication system 100 can operate adaptively to a change of an element within the group using the HE scheme. That is, the communication system 100 can update the group key for the electronic devices 110 of a changed group.

The electronic device according to various embodiments disclosed in this document may be various types of devices. The electronic device may include a portable communication device (e.g., smartphone), a computer device, a portable multimedia device, a portable medical device, a camera, a wearable device, a robot or home appliances, for example. The electronic device according to various embodiments of this document is not limited to the aforementioned devices.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

Various embodiments of this document may be implemented in the form of software including one or more instructions stored in a storage medium (e.g., memory) readable by a machine (e.g., electronic device 110 or server 120). For example, the processor of the machine may fetch at least one of one or more stored instructions from a storage medium, and may execute the one or more instructions. This enables the machine to perform at least one function based on the fetched at least one instruction. The one or more instructions may include code generated by a complier or code executable by an interpreter. The storage medium readable by the machine may be provided in the form of a non-transitory storage medium. In this case, "non-transitory" means that a storage medium is a tangible device and does not include a signal (e.g., electromagnetic waves). The term is not used regardless of whether data is semi-persistently stored in a storage medium and whether data is temporally stored in a storage medium.

According to various embodiments, each (e.g., module or program) of the described elements may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into one element. In such a case, the integrated elements may perform one or more functions of each of a plurality of elements identically with or similar to that performed by a corresponding one of the plurality of elements before the elements are integrated. According to various embodiments, module, operations performed by a program or other elements may be executed sequentially, in parallel, repeatedly, or heuristically, or one or more of the operations may be executed in different order or may be omitted, or one or more other operations may be added.

According to various embodiments, a communication system can enable electronic devices attempting to form a group to safely share a group key to be used for mutual communication between the electronic devices using the HE scheme. In this case, the HE key used to generate the group key is not exposed to a server, and the electronic devices can share the group key under the support of the server. That is, the group key is safely shared by the electronic devices within the group, and may not be exposed to an element expect the electronic devices within the group. According to one embodiment, the communication system can operate adaptively to a change of an element within the group using the HE scheme. That is, the communication system can update the group key for the electronic devices of a changed group.

What is claimed is:

1. An operating method of a communication system, comprising:
    sharing, by a plurality of electronic devices for forming a group, a homomorphic encryption (HE) key;
    generating, by a server, a Boolean circuit for performing an operation based on input values corresponding to a number of the electronic devices;
    transmitting, by each of the electronic devices, an encrypted session ephemeral key to the server through HE;
    calculating, by the server, an HE-evaluated value by applying the encrypted session ephemeral keys as the input values of the Boolean circuit;
    transmitting, by the server, the HE-evaluated value and a given random number to each of the electronic devices; and
    generating, by each of the electronic devices, a common session key for the group based on the HE key, the HE-evaluated value and the given random number through homomorphic decryption,
    wherein the HE key comprises at least any one of a homomorphic secret key or a homomorphic public key, and
    wherein the encrypted session ephemeral key is generated from the homomorphic public key and the session ephemeral key of each of the electronic devices through the HE.

2. The operating method of claim 1, wherein the generating of the session key comprises:
    obtaining a homomorphic decryption value from the homomorphic secret key and the HE-evaluated value through the homomorphic decryption; and
    obtaining the session key by adding the homomorphic decryption value and the given random number.

3. The operating method of claim 2, wherein the transmitting of the HE-evaluated value and the given random number comprises:

generating an encryption message, comprising the HE-evaluated value and the encrypted random number, by encrypting the given random number using a communication secret key; and transmitting the encryption message to each of the electronic devices.

4. The operating method of claim 3, wherein the generating of the session key further comprises:

obtaining the HE-evaluated value and the given random number by decrypting the encrypted random number within the encryption message using the communication secret key.

5. The operating method of claim 1, further comprising:

detecting, by the server and the electronic devices, at least another electronic device to be added to the group;

providing, by at least any one of the electronic devices, the HE key to the another electronic device; and updating, by the server, the Boolean circuit based on a number of the electronic devices and the another electronic device, wherein each of the transmitting of the encrypted session ephemeral key, the calculating of the HE-evaluated value, the transmitting of the HE-evaluated value and the given random number, and the generating of the session key is performed by the server or the electronic devices and the another electronic device again.

6. The operating method of claim 1, further comprising:

detecting, by the server, any one of the electronic devices removed from the group; and updating, by the server, the Boolean circuit based on a number of remaining electronic devices of the electronic devices, wherein each of the transmitting of the encrypted session ephemeral key, the calculating of the HE-evaluated value, the transmitting of the HE-evaluated value and the given random number, and the generating of the session key is performed by the server or the remaining electronic devices again.

7. A communication system comprising:

a plurality of electronic devices configured to share a homomorphic encryption (HE) key in order to form a group; and a server configured to generate a Boolean circuit for performing an operation based on input values corresponding to a number of the electronic devices, wherein the server is configured to:

receive an encrypted session ephemeral key from each of the electronic devices through HE, calculate an HE-evaluated value by applying the encrypted session ephemeral keys as the input values of the Boolean circuit, and transmit the HE-evaluated value and a given random number to each of the electronic devices, and wherein each of the electronic devices is configured to generate a common session key for the group based on the HE key, the HE-evaluated value and the given random number through homomorphic decryption wherein the HE key comprises at least any one of a homomorphic secret key or a homomorphic public key, and wherein the encrypted session ephemeral key is generated from the homomorphic public key and the session ephemeral key of each of the electronic devices through the HE.

8. The communication system of claim 7, wherein each of the electronic devices is configured to:

obtain a homomorphic decryption value by decrypting the homomorphic secret key and the HE-evaluated value through the homomorphic decryption, and obtain the session key by adding the homomorphic decryption value and the given random number.

9. The communication system of claim 8, wherein the server is configured to:

generate an encryption message, comprising the HE-evaluated value and the encrypted random number, by encrypting the given random number using a communication secret key; and transmit the encryption message to each of the electronic devices.

10. The communication system of claim 9, wherein each of the electronic devices is configured to:

obtain the HE-evaluated value and the given random number by decrypting the encrypted random number within the encryption message using the communication secret key.

11. The communication system of claim 7, wherein the server is configured to:

detect at least another electronic device to be added to the group and update the Boolean circuit based on a number of the electronic devices and the another electronic device, receive another encrypted session ephemeral key from each of the electronic devices and the another electronic device through the HE, calculating another HE-evaluated value by applying the another encrypted session ephemeral keys as he input values of the Boolean circuit, and transmit the another HE-evaluated value and another given random number to each of the electronic devices and the another electronic device using a communication secret key of the electronic devices and the another electronic device.

12. The communication system of claim 11, wherein at least any one of the electronic devices is configured to provide the HE key to the another electronic device, and wherein each of the electronic devices and the another electronic device is configured to generate the common session key for the group again based on the HE key, the another HE-evaluated value and the another given random number through the homomorphic decryption.

13. The communication system of claim 7, wherein the server is configured to:

detect any one of the electronic devices removed from the group, update the Boolean circuit based on a number of remaining electronic devices of the electronic devices, receive another encrypted session ephemeral key from the remaining electronic devices through the HE, calculate another HE-evaluated value by applying the another encrypted session ephemeral keys as the input values of the Boolean circuit, and transmit the another HE-evaluated value and another given random number to each of the remaining electronic devices using a communication secret key of each of the remaining electronic devices.

14. The communication system of claim 13, wherein the remaining electronic devices are configured to:

generate a common session key for the group again based on the HE key, the another HE-evaluated value and the another given random number through the homomorphic decryption.

15. An operating method of a communication system, comprising: sharing, by a plurality of electronic devices for forming a group, a homomorphic encryption (HE) key;

generating, by a server, a Boolean circuit for performing an operation based on input values corresponding to a number of the electronic devices;

transmitting, by each of the electronic devices, an encrypted session ephemeral key to the server through HE;

calculating, by the server, an HE-evaluated value by applying the encrypted session ephemeral keys as the input values of the Boolean circuit;

transmitting, by the server, the HE-evaluated value to each of the electronic devices; and generating, by each of the electronic devices, a common session key for the group based on the HE key and the HE-evaluated value through homomorphic decryption wherein the HE key comprises at least any one of a homomorphic secret key or a homomorphic public key, wherein the encrypted session ephemeral key is generated from the homomorphic public key and the session ephemeral key of each of the electronic devices through the HE, and wherein the session key is generated from the homomorphic secret key and the HE-evaluated value through the homomorphic decryption.

16. A communication system comprising:

a plurality of electronic devices configured to share a homomorphic encryption (HE) key in order to form a group; and a server configured to generate a Boolean circuit for performing an operation based on input values corresponding to a number of the electronic devices, wherein the server is configured to:

receive an encrypted session ephemeral key from each of the electronic devices through HE, calculating an HE-evaluated value by applying the encrypted session ephemeral keys as the input values of the Boolean circuit, and transmit the HE-evaluated value to each of the electronic devices, wherein each of the electronic devices is configured to generate a common session key for the group based on the HE key and the HE-evaluated value through homomorphic decryption wherein the HE key comprises at least any one of a homomorphic secret key or a homomorphic public key, wherein the encrypted session ephemeral key is generated from the homomorphic public key and the session ephemeral key of each of the electronic devices through HE, and wherein the session key is generated from the homomorphic secret key and the HE-evaluated value through the homomorphic decryption.

* * * * *